United States Patent
Sawai et al.

(10) Patent No.: US 7,206,723 B2
(45) Date of Patent: Apr. 17, 2007

(54) METHOD OF ASSISTING WIRING DESIGN OF WIRING STRUCTURE, ITS APPARATUS AND ITS PROGRAM

(75) Inventors: Masayoshi Sawai, Kosai (JP);
Tomohiro Yoneyama, Kosai (JP);
Akiko Nakano, Kosai (JP)

(73) Assignee: Yazaki Corporation, Tokyo (JP)

( * ) Notice: Subject to any disclaimer, the term of this patent is extended or adjusted under 35 U.S.C. 154(b) by 522 days.

(21) Appl. No.: 10/669,891

(22) Filed: Sep. 25, 2003

(65) Prior Publication Data

US 2004/0130878 A1 Jul. 8, 2004

(30) Foreign Application Priority Data

| Sep. 25, 2002 | (JP) | ............................ P2002-279500 |
| Sep. 25, 2002 | (JP) | ............................ P2002-279501 |
| Sep. 25, 2002 | (JP) | ............................ P2002-279502 |
| Sep. 1, 2003 | (JP) | ............................ P2003-308506 |
| Sep. 1, 2003 | (JP) | ............................ P2003-308509 |
| Sep. 1, 2003 | (JP) | ............................ P2003-308510 |

(51) Int. Cl.
*G06F 17/50* (2006.01)
(52) U.S. Cl. ........................................... 703/1; 73/783
(58) Field of Classification Search .................... 703/1, 703/2; 73/783; 374/46; 702/42
See application file for complete search history.

(56) References Cited

U.S. PATENT DOCUMENTS 6,246,011 B1 * 6/2001 Abraham et al. ........... 174/260

6,839,642 B2 * 1/2005 Kawakita et al. ............. 702/42
6,904,395 B1 * 6/2005 DeJack et al. .................. 703/7

FOREIGN PATENT DOCUMENTS

| DE | 199 35 422 A | 2/2001 |
| EP | 0 967122 A2 | 12/1999 |
| JP | 2001-250438 A | 9/2001 |
| JP | 2001-251740 A | 9/2001 |
| JP | 2001-251741 A | 9/2001 |
| WO | WO 02-059801 A2 | 8/2002 |

OTHER PUBLICATIONS

Alibozek T: "Smart Software Builds a Better Harness" Machine Design, Penton, Inc. Cleveland, US, vol. 70, No. 8, May 7, 1998, pp. 89-92, XP001092826 ISSN: 0024-9114.
Patent Abstracts of Japan vol. 2002, No. 12, Dec. 12, 2002.

* cited by examiner

*Primary Examiner*—Albert W. Paladini
(74) *Attorney, Agent, or Firm*—Sughrue Mion, PLLC

(57) ABSTRACT

A method of assisting a wiring design of a wiring structure includes the steps of: regarding the wiring structure constituted by a plurality of pieces of line streak members as an elastic body which has a circular section and in which a plurality of beam elements a linearity of which is maintained are coupled with each other; applying information concerning a shape characteristic, a material characteristic and a constraining condition of the wiring structure as a predetermined condition to a finite element method; calculating a predicted shape of the forcibly displaced wiring structure such that the predetermined condition is satisfied; and outputting the calculated predicted shape.

31 Claims, 13 Drawing Sheets

FIG. 2

| | | X-AXIS DIRECTION TRANSLATION | Y-AXIS DIRECTION TRANSLATION | Z-AXIS DIRECTION TRANSLATION | ROTATION AROUND X-AXIS | ROTATION AROUND Y-AXIS | ROTATION AROUND Z-AXIS |
|---|---|---|---|---|---|---|---|
| COMPLETELY CONSTRAINED | CONNECTOR | IMPOSSIBLE | IMPOSSIBLE | IMPOSSIBLE | IMPOSSIBLE | IMPOSSIBLE | IMPOSSIBLE |
| COMPLETELY CONSTRAINED | LONG HOLE CLIP | IMPOSSIBLE | IMPOSSIBLE | IMPOSSIBLE | IMPOSSIBLE | IMPOSSIBLE | IMPOSSIBLE |
| ROTATABLY CONSTRAINED | ROUND HOLE CLIP | IMPOSSIBLE | IMPOSSIBLE | IMPOSSIBLE | IMPOSSIBLE | IMPOSSIBLE | POSSIBLE |
| ROTATABLY CONSTRAINED | CORRUGATED LONG HOLE CLIP | IMPOSSIBLE | IMPOSSIBLE | IMPOSSIBLE | POSSIBLE | IMPOSSIBLE | IMPOSSIBLE |
| ROTATABLY CONSTRAINED | CORRUGATED ROUND HOLE CLIP | IMPOSSIBLE | IMPOSSIBLE | IMPOSSIBLE | POSSIBLE | IMPOSSIBLE | POSSIBLE |
| COMPLETELY CONSTRAINED | BRANCH POINT | POSSIBLE | POSSIBLE | POSSIBLE | POSSIBLE | POSSIBLE | POSSIBLE |

METHOD OF ASSISTING WIRING DESIGN OF WIRING STRUCTURE, ITS APPARATUS AND ITS PROGRAM

BACKGROUND OF THE INVENTION

The present invention relates to a method of assisting a wiring design of a wiring structure constituted by a plurality of line streak members, its apparatus and its program, particularly to a method, an apparatus and a program of assisting an optimum wiring design of a wire harness wired at a vehicle as a wiring structure.

Normally, at a vehicle or the like, a plurality of electrical equipments are mounted thereon, and the electrical equipments are connected by a so-to-speak wire harness in which a plurality of electric wires or communication lines are bundled by a bundling member of an insulock or the like or a protective member of a tape or the like as the line streak members. As shown by FIG. 1, a wire harness 1 is attached with connectors 2a, 2b, 2c and 2d respective end portions of which are connected to electrical equipments or the like. Further, various clips 3a, 3b, 3c, 3d are attached to middle portions thereof, further, a branch point 4 is provided thereto. Further, respective branch lines of the wire harness 1 constituting from the respective end portions to the branch point 4 are basically provided with different numbers and kinds of constituent line streak members and therefore, the respective branch lines are provided with various boldnesses, lengths, elasticities, rigidities and the like. Further, in a prior art, a wiring design of such a wire harness is frequently carried out mainly by hunch and experience of a designer.

A literature cited in the specification will be shown here as follows.

[Nonpatent Literature 1]
"Matrix finite element method" by B. Nas, Brain Publishing Co., Aug. 10, 1978, p. 7–15

According to the wire harness designed as described above, although coordinates of fixed points attached with connectors or the like are tentatively satisfied, it is difficult to design optimum wirings and shapes since there are rigidities and the like against bending or torsion at respective portions of the wire harness. That is, integration as designed is frequently difficult and an unrealistic shape is frequently constituted. Therefore, a high degree of skill is requested in designing optimum wirings of the wire harness or enormous time is dissipated by trial and error.

SUMMARY OF THE INVENTION

Therefore, in view of the above-described current state, embodiments of the invention provide an apparatus, a program and a method of easily designing an optimal wiring structure without depending on the skill of a designer by representing the wiring structure as an elastic body and an elastic-plastic body and applying a finite element method thereto.

One such embodiment is characterized by performing the following method.

A method of designing a wiring structure includes the steps of:

representing the wiring structure as an elastic body which has a circular cross-section and in which a plurality of linear beam elements are coupled to each other;

applying information concerning a shape characteristic, a material characteristic and a constraining condition of the wiring structure as a predetermined condition for a finite element method;

calculating a predicted shape of the displaced wiring structure such that the predetermined condition is satisfied; and outputting the calculated predicted shape.

The calculating step calculates the predicted shape where the wiring structure is forcibly displaced so as to satisfy the predetermined condition.

Information concerning a change in the shape characteristic, the material characteristic and the constraining condition is provided to the outputted predicted shape, a new predicted shape of the forcibly displaced wiring structure is calculated again by utilizing the finite element method, and the new predicted shape is output again to enable verification of an optimum shape of the wiring structure.

The wiring structure can be a wire harness wired to a vehicle, the constraining condition can be defined by coordinates of respective apexes of the plurality of beam elements and degrees of freedom at the respective apexes, the shape characteristic can be defined by a sectional area and a length of the beam element of the wiring structure, and the material characteristic can be defined by a moment of inertia, a polar moment of inertia, a density and a longitudinal modulus of elasticity and a transverse modulus of elasticity of the beam element.

In the calculating step, strain and stress of the wiring structure can be calculated and in the outputting step, the calculated strain and stress can be outputted together with the calculated predicted shape.

The calculated strain and stress can be displayed in multicolor in accordance with values of the strain and stress.

In the calculating step, reaction force and moment produced at a constraining point of the wiring structure can be calculated, and in the outputting step, the calculated reaction force and moment can be output together with the calculated strain, stress and predicted shape.

In the outputting step, the calculated reaction force and moment can be output together with the calculated predicted shape.

The calculated reaction force and moment can be displayed by arrow marks.

In the calculating step, deformation states of the wiring structure deformed from an arbitrary initial shape to a final shape which satisfies the predetermined condition can be successively calculated, and in the outputting step, the calculated deformation states of the wiring structure can be successively outputted.

The deformation states of the wiring structure when predetermined force is applied to a predetermined portion of the wiring structure can be successively calculated and outputted.

According to another embodiment, a method of assisting a wiring design of a wiring structure includes the steps of:

representing the wiring structure as an elastic body which has a circular cross-section and in which a plurality of linear beam elements are coupled to each other, calculating an initial shape of the wiring structure based on a predetermined bending radius, a constrained position of the wiring structure, and a constrained direction with respect to the wiring structure at the constrained position as an initial value;

providing, to the initial shape, a condition concerning a shape characteristic, a material characteristic and a constraining condition of the wiring structure;

calculating a predicted shape of the forcibly displaced wiring structure such that the provided condition is satisfied by utilizing a finite element method; and outputting the calculated predicted shape.

Information concerning a change in the shape characteristic, the material characteristic and the constraining condition can be provided to the outputted predicted shape, a new predicted shape of the forcibly displaced wiring structure can be calculated again by utilizing the finite element method, and the new predicted shape can be output again to enable verification of an optimum shape of the wiring structure.

The wiring structure can be a wire harness wired to a vehicle, the constraining condition can be defined by coordinates of respective apexes of the plurality of beam elements and degrees of freedom at the respective apexes, the shape characteristic can be defined by a sectional area and a length of the beam element of the wiring structure, and the material characteristic can be defined by a moment of inertia, a polar moment of inertia, a density and a longitudinal modulus of elasticity and a transverse modulus of elasticity of the beam element.

According to yet another embodiment, an apparatus for designing a wiring structure represented as an elastic body which has a circular cross-section and in which a plurality of linear beam elements are coupled with each other, and a shape of the wiring structure which satisfies a predetermined condition is predicted by utilizing a finite element method. The apparatus includes a setting unit for setting information concerning a shape characteristic, a material characteristic and a constraining condition of the wiring structure as the predetermined condition;

a calculating unit for calculating a predicted shape of the displaced wiring structure such that the condition is satisfied by applying the predetermined condition to the finite element method; and an outputting unit for outputting the predicted shape calculated by the calculating unit.

The calculating unit can calculates the predicted shape where the wiring structure is forcibly displaced so as to satisfy the condition.

The apparatus further includes a verifying unit which provides information concerning a change in the shape characteristic, the material characteristic and the constraining condition for the predicted shaped output by the outputting unit, calculates again a new predicated shape of the forcibly displaced wiring structure by utilizing the finite element method and makes the outputting unit output the new calculated predicted shape to enable verification of an optimum shape of the wiring structure.

The calculating unit calculates strain and stress of the wiring structure, and the outputting unit outputs the calculated strain and stress together with the calculated predicted shape.

The calculating unit calculates reaction force and moment produced at a constraining point of the wiring structure, and the outputting unit outputs the calculated reaction force and moment together with the calculated predicted shape.

The calculating unit successively calculates states of the wiring structure deformed from an arbitrary initial shape to a final shape which satisfies the predetermined condition, and the outputting unit successively outputs the calculated states of the wiring structure.

The apparatus to (20) further includes a second setting unit for setting a predetermined force applied to a predetermined portion of the wiring structure as the predetermined condition, wherein the calculating unit successively calculates the deformation states of the wiring structure to which the force is applied, and the outputting unit successively updates and outputs the deformation state of the wiring structure based on the calculated deformation states of the wiring structure.

The apparatus further includes a temporary stopping unit for temporarily stopping the output of the outputting unit by a trigger based on a manual operation.

According to still another embodiment, an apparatus for assisting in designing a wiring structure is represented as an elastic body which has a circular cross-section and in which a plurality of linear beam elements are coupled with each other, and a shape of the wiring structure which satisfies a predetermined condition is predicted by utilizing a finite element method. The apparatus includes:

a first calculating unit for calculating an initial shape of the wiring structure based on a predetermined bending radius, a constrained position of the wiring structure and a constrained direction with respect to the wiring structure at the constrained position set as an initial value;

a setting unit for setting a condition concerning a shape characteristic, a material characteristic and a constraining condition of the wiring structure to the initial shape;

a second calculating unit for calculating a predicated shape of the forcibly displaced wiring structure such that the set condition is satisfied by utilizing the finite element method; and an outputting unit for outputting the predicted shape calculated by the second calculating unit.

The apparatus further includes a verifying unit which provides information concerning a change in the shape characteristic, the material characteristic and the constraining condition to the predicted shaped output by the outputting unit, calculates again a new predicated shape of the forcibly displaced wiring structure by utilizing the finite element method and makes the outputting unit output the new calculated predicted shape to enable verification of an optimum shape of the wiring structure.

A recording medium stores a program which causes a computer to function as an apparatus for assisting in the design of a wiring structure represented as an elastic body which has a circular cross-section and in which a plurality of linear beam elements are coupled with each other, and a shape of the wiring structure which satisfies a predetermined condition is predicted by utilizing a finite element method, the program causing the computer to function as:

a setting unit for setting information concerning a shape characteristic, a material characteristic and a constraining condition of the wiring structure as the predetermined condition;

a calculating unit for calculating a predicted shape of a forcibly displaced wiring structure by applying the predetermined condition to the finite element method such that the condition is satisfied; and an outputting unit for outputting the predicted shape calculated by the calculating unit.

The calculating unit calculates the predicted shape where the wiring structure is forcibly displaced so as to satisfy the condition.

The program causes the computer to calculate strain and stress of the wiring structure, and output the calculated strain and stress together with the calculated predicted shape.

The program causes the computer to calculate reaction force and moment produced at a constraining point of the wiring structure, and output the calculated reaction force and moment together with the calculated predicted shape.

The program causes the computer to successively calculate deformation states of the wiring structure deformed from an arbitrary initial shape to a final shape which satisfies the predetermined condition, and successively update and output the deformation state of the wiring structure based on the calculated states of the wiring structure.

A recording medium stores a program which causes a computer to function as an apparatus of assisting in the design of a wiring structure represented as an elastic body which has a circular cross-section and in which a plurality of linear beam elements are coupled with each other, and a shape of the wiring structure which satisfies a predetermined condition is predicted by utilizing a finite element method. The program causing the computer to function as:

a first calculating unit for calculating an initial shape of the wiring structure based on a predetermined bending radius, a constrained position of the wiring structure and a constrained direction with respect to the wiring structure at the constrained position set as an initial value;

a setting unit for setting a condition concerning a shape characteristic, a material characteristic and a constraining condition of the wiring structure to the initial shape;

a second calculating unit for calculating a predicated shape of a forcibly displaced wiring structure by utilizing the finite element method such that the set condition is satisfied; and an outputting unit for outputting the predicted shape calculated by the second calculating unit.

A method of assisting with a wiring design of a wiring structure by calculating a predicted shape concerning the wiring structure includes the steps of:

successively calculating deformation states of the wiring structure deformed from an arbitrary initial shape to a final shape; and successively outputting the calculated states.

BRIEF DESCRIPTION OF THE DRAWINGS

FIG. 2 is a diagram showing a relationship between representative supporting members for supporting the wire harness and constrained degrees of freedom.

DETAILED DESCRIPTION OF PREFERRED EMBODIMENTS

Figure 1:
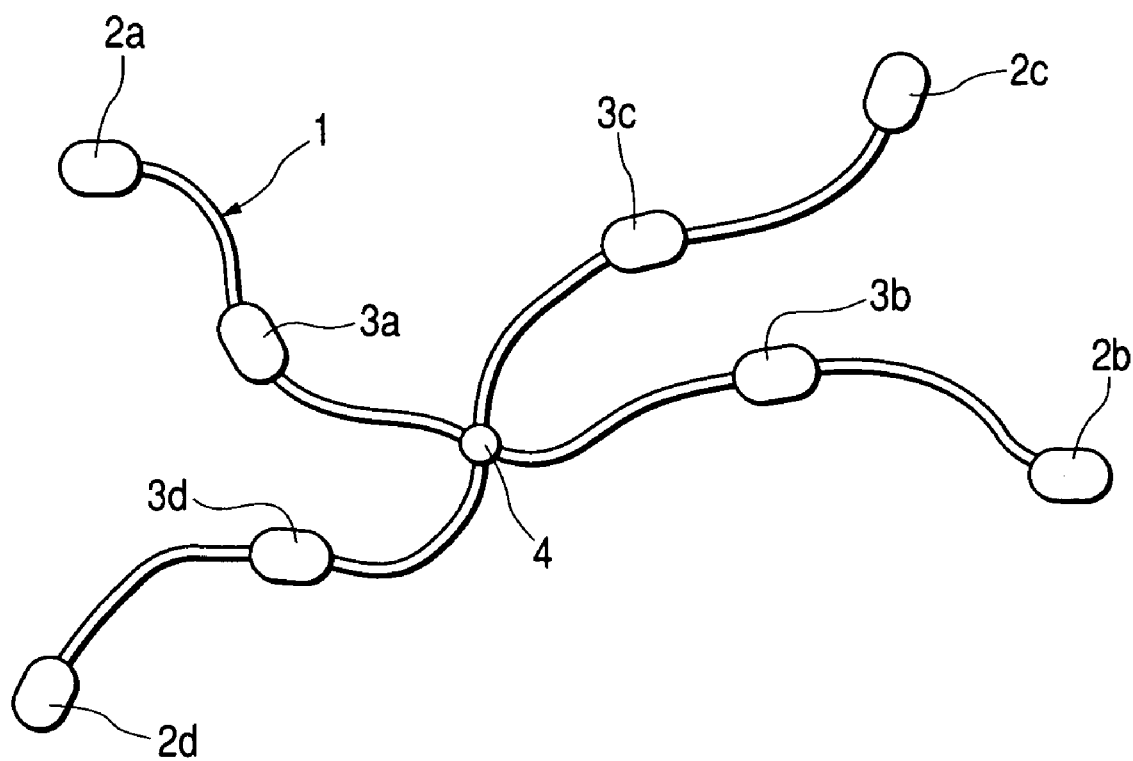
FIG. 1 is a view showing an outline of a total shape of a wire harness constituting an object of design according to an embodiment of the invention.

An embodiment of the invention will be explained in reference to drawings as follows. First, an explanation will be given of a total shape of a wire harness as a wiring structure constituting an object of design and representative supporting members in reference to FIG. 1 and FIG. 2. FIG. 1 is a view showing an outline of the total shape of the wire harness constituting the object of design according to the embodiment of the invention. FIG. 2 is a diagram showing a relationship between the representative supporting members for supporting the wire harness and constrained degrees of freedom. The embodiment assists design by simulating to output a predicted shape for the wire harness shown here although a description thereof will be given later.

As described above, the wire harness 1 constituting the object of design according to the embodiment is attached with four connectors 2a, 2b, 2c, 2d both end portions of which are connected with electrical equipments, not illustrated, attached with the various clips 3a, 3b, 3c and 3d at middle portions thereof and is provided with the branch point 4. The respective branch lines of the wire harness 1 are basically provided with different numbers and kinds of respective constituent line streak members and therefore, the respective branch lines are provided with different boldnesses, lengths, elasticities, rigidities and the like.

The respective connectors 2a, 2b, 2c and 2d are attachably and detachably fixed at predetermined positions in accordance with fixed positions and mounting directions of opposed side connectors on sides of the electrical equipments to completely constrain end portions of the wire harness. Further, the respective clips 3a, 3b, 3c, 3d completely constrain or rotatably constrain predetermined portions of the wire harness at predetermined positions of cabinets, stays or the like of the electrical equipments.

Here, an explanation will be given of the clips. In the clips, basically, there are long hole clips and round hole clips. The round hole clip is referred to also as rotational clip and is constituted by a base seat portion holding the wire harness and a support leg inserted into an attaching hole in a shape of a round hole provided at the stay or the like. The round hole clip is rotatable around Z-axis (in a direction orthogonal to an attaching portion).

Meanwhile, the long hole clip is referred to also as fixed flip and is constituted by a base seat portion holding the wire harness and a support leg inserted into an attaching hole in a shape of a long hole provided at the stay or the like. A sectional shape of the support leg is constituted by a shape of a long hole substantially similar to that of the attaching hole. The long hole clip is not rotatable around Z-axis.

Further, in the long hole clip and the round hole clip, there are a corrugated long hole clip and a corrugated round hole clip rotatable around X-axes (in a longitudinal direction of the wire harness). Constrained degrees of freedom of the respective clips in respective axial directions and around respective axes are as shown by FIG. 2.

In FIG. 2, X-axis, Y-axis and Z-axis correspond to three axes orthogonal to each other in a right hand local coordinates system at respective node points (or also referred to as nodes) on the wire harness. Although for example, the Z-axis for a clip is made to coincide with a clip axis, a method of determining the axes can pertinently be changed in accordance with a function used. Further, in the drawing, constrained degrees of freedom of the branch point are also shown for reference. Further, a node point on the wire harness arbitrarily set other than the above-described constrained points is basically completely free although not illustrated here. The constrained degrees of freedom are respectively set to the respective nodes prior to calculating a predicted path, a reaction force or the like as described later.

Figure 3A:
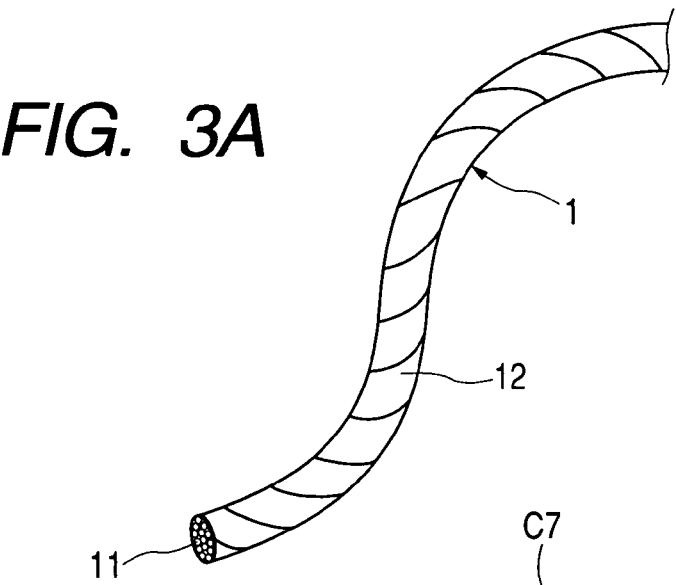
FIG. 3A is a view showing an outlook of the wire harness.
Figure 3B:
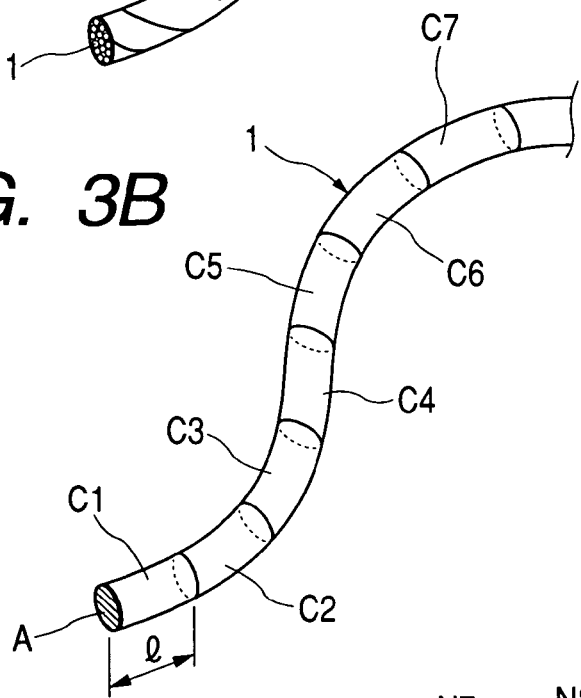
FIG. 3B is a view showing a state of digitizing the wire harness of FIG. 3A
Figure 3C:
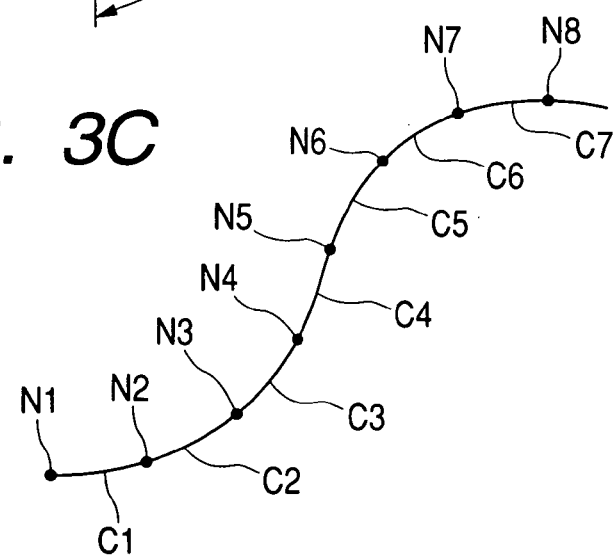
FIG. 3C is a view expressing the wire harness of FIG. 3A by a beam element and a node point.
Figure 4:
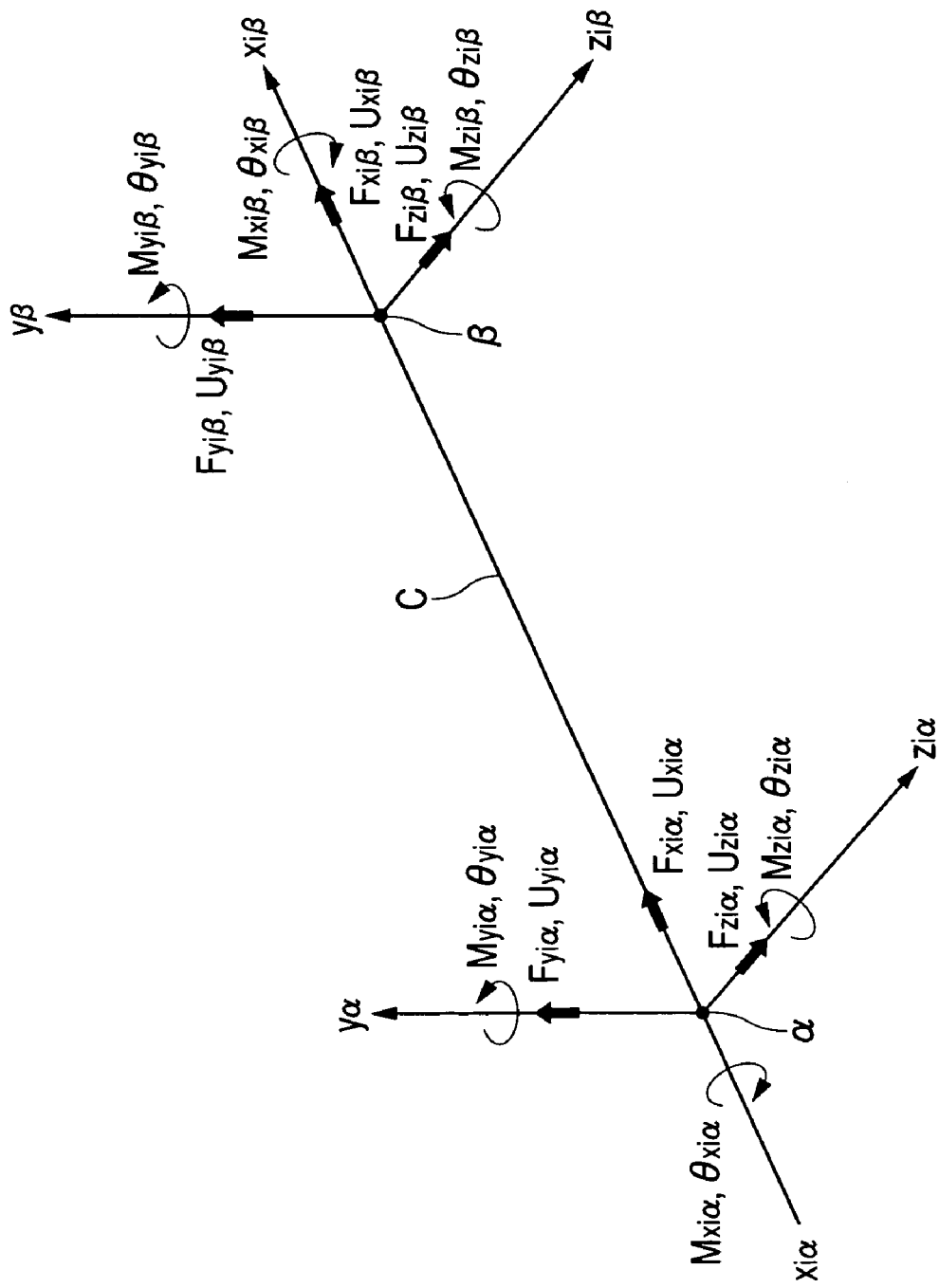
FIG. 4 is a diagram for explaining a degree of freedom of the wire harness expressed by the beam element and the node point.
Figure 5A:
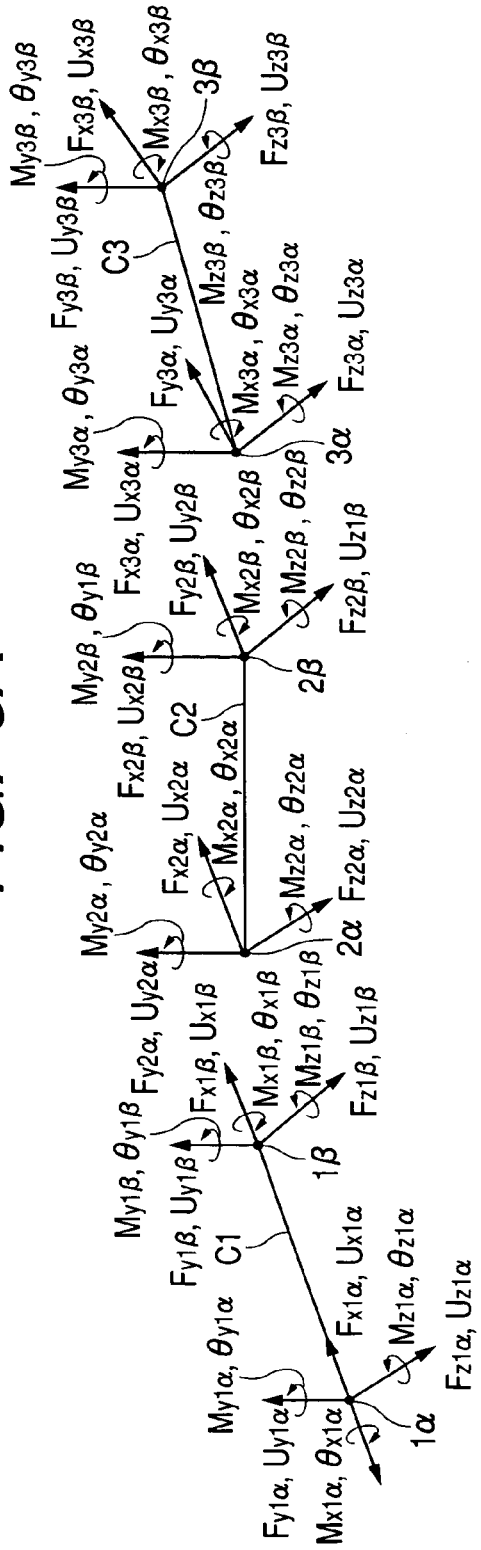
FIG. 5A is a diagram expressing the wire harness by three beam elements and FIG. 5B is a diagram showing a state of coupling the three beam elements of FIG. 5A.
Figure 5B:
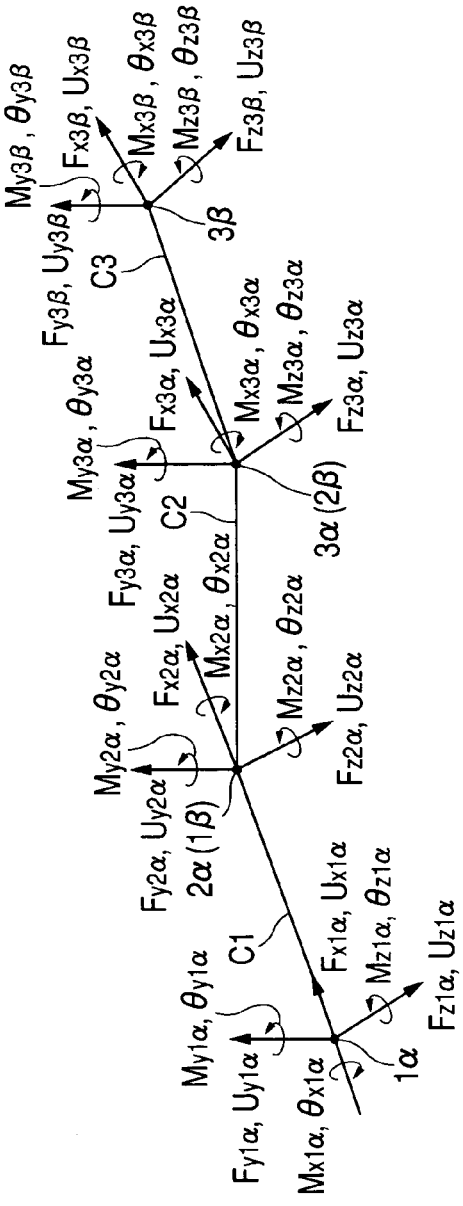
Figure 6A:
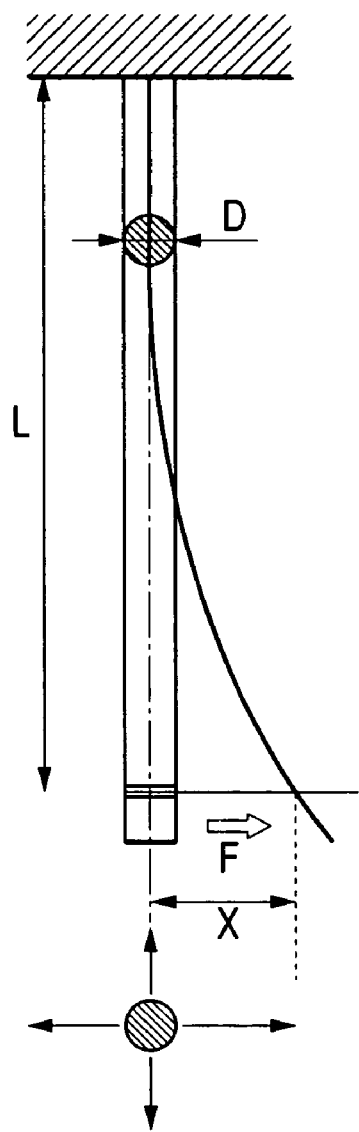
FIG. 6A is a view showing a state of measuring a moment of inertia and a longitudinal modulus of elasticity and FIG. 6B is a view showing a state of measuring a polar moment of inertia and a transverse modulus of elasticity.
Figure 6B:
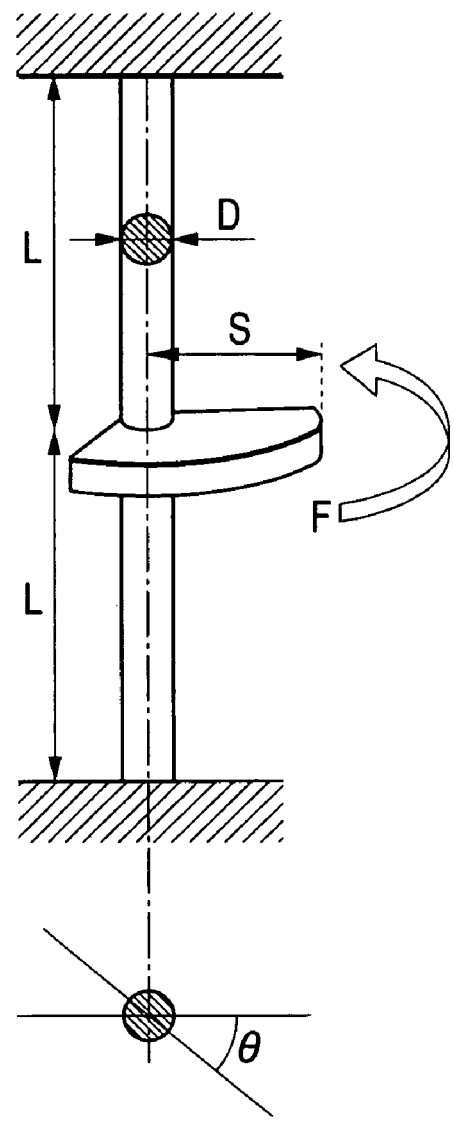

Next, an explanation will be given of outlines of assuming conditions constituting a premise, a utilized theory and basic equations in reference to FIG. 3 through FIG. 6. FIG. 3(A) is a view showing an outlook of the wire harness, FIG. 3(B) is a view showing a state of digitizing the wire harness, and FIG. 3(C) is a view showing the wire harness of FIG. 3(A) by beam elements and node points. FIG. 4 is a view for explaining degrees of freedom of the wire harness shown by the beam elements and the node points. FIG. 5(A) is a view showing the wire harness by three beam elements and FIG. 5(B) is a view showing a state of coupling three of the beam elements of FIG. 5(A). Further, FIG. 6(A) is a view showing a state of measuring a moment of inertia and a longitudinal modulus of elasticity and FIG. 6(B) is a view showing a state of measuring a polar moment of inertia and a transverse modulus of elasticity.

First, according to the embodiment, in utilizing a finite element method in designing the wire harness, it is assumed as follows.

(1) The wire harness is assumed to be an elastic body.

(2) The wire harness is assumed to be coupled with beam elements.

(3) It is assumed that linearity is maintained at each beam element.

(4) A section of the wire harness is assumed to be circular.

By assuming in this way in this embodiment, application of the finite element method to the wire harness which has not been carried out, can be carried out.

According to the embodiment, first, the wire harness is digitized. That is, as shown by FIG. 3(A), the wire harness 1 in which a plurality of electric wires 11 are bundled by a protective member of a tape 12 or the like can be regarded as a continuous body. Next, as shown by FIG. 3(B), the wire harness 1 is divided (digitized) into a number of beam elements C1, C2, C3, .... That is, since the wire harness is like a single piece of rope and therefore, the wire harness can be regarded to be connected with a finite number of pieces of the beam elements.

Therefore, as shown by FIG. 3(C), the wire harness can be represented by coupling the plurality of beam elements C1, C2, C3, ... by a plurality of nodes N1, N2, N3, .... Characteristic values necessary for the beam element are as follows.

length 1 (refer to FIG. 3(B))

sectional area A (refer to FIG. 3(B))

moment of inertia I polar moment of inertia J density $\rho$ longitudinal modulus of elasticity E transverse modulus of elasticity G Further, in the specification, shape characteristics are constituted by the length 1 and the sectional area A and material characteristic are constituted by the moment of inertia I, the polar moment of inertia J, the density $\rho$, the longitudinal modulus of elasticity E and the transverse modulus of elasticity although a description thereof will be given later.

Further, as shown by FIG. 4, each beam element C (C1, C2, C3, ... ) is provided with two of a node point $\alpha$ and a node point $\beta$. In a three-dimensional space, the node point $\alpha$ is provided with 3 of translation components and 3 of rotation components and therefore, the node point $\alpha$ is provided with a total of 6 degrees of freedom. Further, the same goes with the node point $\beta$. Therefore, the beam element C is provided with 12 degrees of freedom.

Further, in the drawing, $F_{xi}$: force in xi-axis direction of i-th element $F_{yi}$: force in yi-axis direction of i-th element $F_{zi}$: force in zi-axis direction of i-th element $M_{xi}$: moment around xi-axis of i-th element $M_{yi}$: moment around yi-axis of i-th element $M_{zi}$: moment around zi-axis of i-th element $U_{xi}$: displacement in xi-axis direction of i-th element $U_{yi}$: displacement in yi-axis direction of i-th element $U_{zi}$: displacement in zi-axis direction of i-th element $\theta_{xi}$: angular displacement in xi-axis direction of i-th element $\theta_{yi}$: angular displacement in yi-axis direction of i-th element $\theta_{zi}$: angular displacement in zi-axis direction of i-th element notation $\alpha$ designates the node point on the left side and notation $\beta$ designates the node point on the right side.

It is known that Hook's law represented by Equation (1) shown below is established in displacement of a structure by a static force which is not vibrating in an elastic range.

$$Kx = F \qquad (1)$$

where K: spring constant, x: displacement, F: force.

Further, it is known that Hook's law is established similarly also in the beam element C shown in FIG. 4. However, the beam element C is provided with 12 degrees of freedom as described above and therefore, a relationship between force and displacement can be expressed by a matrix of 12 rows and 12 columns and vectors of 12 rows as indicated by Equation (2) shown below.

[Equation 1]

$$\left\{ \begin{array}{cccccc|cccccc} \frac{AE}{l} & 0 & 0 & 0 & 0 & 0 & -\frac{AE}{l} & 0 & 0 & 0 & 0 & 0 \\ 0 & \frac{12EI_z}{l^3} & 0 & 0 & 0 & \frac{6EI_z}{l^2} & 0 & -\frac{12EI_z}{l^3} & 0 & 0 & 0 & \frac{6EI_z}{l^2} \\ 0 & 0 & \frac{12EI_y}{l^3} & 0 & -\frac{6EI_y}{l^2} & 0 & 0 & 0 & -\frac{12EI_y}{l^3} & 0 & -\frac{6EI_y}{l^2} & 0 \\ 0 & 0 & 0 & \frac{GJ}{l} & 0 & 0 & 0 & 0 & 0 & -\frac{GJ}{l} & 0 & 0 \\ 0 & 0 & -\frac{6EI_y}{l^2} & 0 & \frac{4EI_y}{l} & 0 & 0 & 0 & \frac{6EI_y}{l^2} & 0 & \frac{2EI_y}{l} & 0 \\ 0 & \frac{6EI_z}{l^2} & 0 & 0 & 0 & \frac{4EI_z}{l} & 0 & -\frac{6EI_z}{l^2} & 0 & 0 & 0 & \frac{2EI_z}{l} \\ \hline -\frac{AE}{l} & 0 & 0 & 0 & 0 & 0 & \frac{AE}{l} & 0 & 0 & 0 & 0 & 0 \\ 0 & -\frac{12EI_z}{l^3} & 0 & 0 & 0 & \frac{6EI_z}{l^2} & 0 & \frac{12EI_z}{l^3} & 0 & 0 & 0 & -\frac{6EI_z}{l^2} \\ 0 & 0 & -\frac{12EI_y}{l^3} & 0 & \frac{6EI_y}{l^2} & 0 & 0 & 0 & \frac{12EI_y}{l^3} & 0 & \frac{6EI_y}{l^2} & 0 \\ 0 & 0 & 0 & -\frac{GJ}{l} & 0 & 0 & 0 & 0 & 0 & \frac{GJ}{l} & 0 & 0 \\ 0 & 0 & -\frac{6EI_y}{l^2} & 0 & \frac{2EI_y}{l} & 0 & 0 & 0 & \frac{6EI_y}{l^2} & 0 & \frac{4EI_y}{l} & 0 \\ 0 & \frac{6EI_z}{l^2} & 0 & 0 & 0 & \frac{2EI_z}{l} & 0 & -\frac{6EI_z}{l^2} & 0 & 0 & 0 & \frac{4EI_z}{l} \end{array} \right\} \left\{ \begin{array}{c} U_{xi\alpha} \\ U_{yi\alpha} \\ U_{zi\alpha} \\ \theta_{xi\alpha} \\ \theta_{yi\alpha} \\ \theta_{zi\alpha} \\ U_{xi\beta} \\ U_{yi\beta} \\ U_{zi\beta} \\ \theta_{xi\beta} \\ \theta_{yi\beta} \\ \theta_{zi\beta} \end{array} \right\} = \left\{ \begin{array}{c} F_{xi\alpha} \\ F_{yi\alpha} \\ F_{zi\alpha} \\ M_{xi\alpha} \\ M_{yi\alpha} \\ M_{zi\alpha} \\ F_{xi\beta} \\ F_{yi\beta} \\ F_{zi\beta} \\ M_{xi\beta} \\ M_{yi\beta} \\ M_{zi\beta} \end{array} \right\}$$

(2)

An explanation will be given here of a compatibility condition and a condition of equilibrium. Here, for simplicity, as shown by FIG. 5(A), the wire harness is represented by 3 of the beam elements C1, C2, C3. In this case, displacements of the node point 1β of the beam elements C1 and the node point 2α of the beam element C2 are equal to each other and forces applied to the two node points are also balanced. Similarly, also displacements of the node point 2β of the beam element C2 and the node point 3α of the beam element C3 are equal to each other and forces applied to the two node points are also balanced. Therefore, the beam elements C1 and C2 and the beam elements C2 and C3 can be coupled as shown by FIG. 5(B) by satisfying continuity of the displacements and the condition of equilibrium.

Further, in the drawing, $F_{xi}$: force in xi-axis direction of i-th element $F_{yi}$: force in yi-axis direction of i-th element $F_{zi}$: force in zi-axis direction of i-th element $M_{xi}$: moment around xi-axis of i-th element $M_{yi}$: moment around yi-axis of i-th element $M_{zi}$: moment around zi-axis of i-th element $U_{xi}$: displacement in xi-axis direction of i-th element $U_{yi}$: displacement in yi-axis direction of i-th element $U_{zi}$: displacement in zi-axis direction of i-th element $\theta_{xi}$: angular displacement in xi-axis direction of i-th element $\theta_{yi}$: angular displacement in yi-axis direction of i-th element $\theta_{zi}$: angular displacement in zi-axis direction of i-th element
and i=1α, 1β, 2α, 2β, 3α, 3β.

Further, when the continuity of the displacements and equilibrium of forces of the beam elements C1, C2, C3 shown in FIG. 5(B) are shown by a style similar to that of Equation (2) as mentioned above, Equation (3) is derived as follows.

[Equation 2]

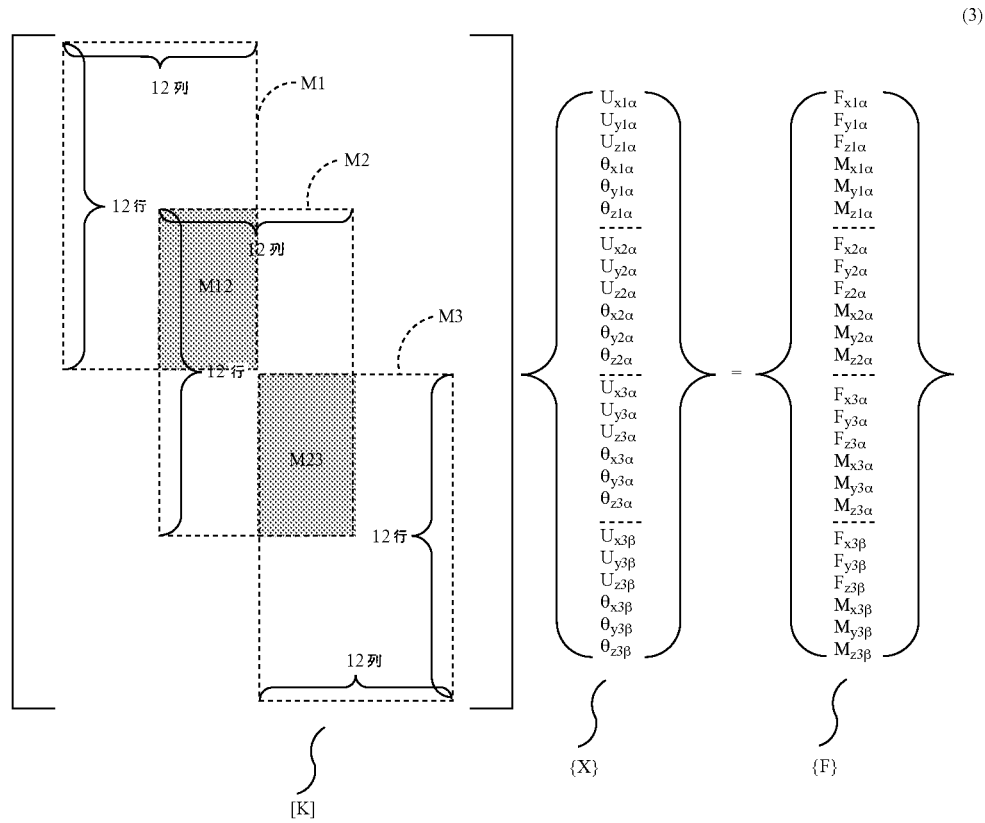

Here, matrices of 12 rows and 12 columns M1, M2 and M3 in Equation (3) are similar to those in shown in Equation (2). However, at the portions M12 and M13 at which the matrices M1, M2 and M3 overlap each other, respective constituent elements of the respective matrices are added together.

Further, 4 or more of the beam elements can similarly be dealt with. In this way, an equation model of a wire harness divided into an arbitrary number of beam elements can be formed.

Incidentally, Equation (3) is simply expressed as follows.

[K]{x}={F}     (4)

Therefore, for example, assuming that a clip is attached to each node point, when a force applied to the clip is previously determined, based on Equation (4), mentioned above, by calculating the displacement vector {x}, a path, that is, a shape of the wire harness can be calculated. Contrary thereto, when the path is determined, the force vector {F} at each node point can be calculated. Based on the basic way of thinking, according to the embodiment, a predicted path and strain, stress, reaction force, moment and the like of the wire harness are calculated. With regard to unknowns in the displacement vector {x} and the force vector {F}, solutions thereof can be calculated by publicly-known Newton-Raphson method, the arc length method or the like.

Further, the above-described general matrix finite element method is shown also in, for example, the above-described nonpatent literature 1.

Here, in the embodiment, an example of a way of calculating respective characteristic values necessary for the beam element will be shown as follows. First, the length l, the sectional area A and the density ρ can be calculated by simple calculation after forming the wire harness constituting the object and measuring the length l, the sectional area A and the density ρ by using a pair of calipers, a measure, a weight meter and the like.

Further, the longitudinal modulus of elasticity E can be represented by Equation (5), shown below, when a measuring method shown in FIG. 6(A) is carried out.

$E = FL^3/3XI$     (5)

Further, the moment of inertia I can be represented by Equation (6), shown below, since the wire harness is assumed to be constituted by a circular section as mentioned above.

$I = \pi D^4/64$     (6)

Therefore, the following equation is established.

$E = 64FL^3/3X\pi D^4$     (7)

According to the measurement, a relationship between F and x may be measured by constituting the following equation.

$E = (F/X) \times (64L^3/3\pi D^4)$

Meanwhile, the transverse modulus of elasticity G can be represented by Equation (8), shown below, when a measuring method shown in FIG. 6(B) is carried out.

$G = (TL/\theta J) \times 2$     (8)

The polar moment of inertia J can be represented by Equation (9), shown below, since the wire harness is assumed to be constituted by the circular section.

$$J = \pi D^4 / 32 \quad (9)$$

Further, the torsional force is expressed as follows.

$$F = FS \quad (10)$$

Therefore, a relation between F and θ may be measured by the following equation.

$$G = (32 FSL/\theta \pi D^4) \times 2 = (F/\theta)(32 SL/\pi D^4) \times 2 \quad (11)$$

The above-described measuring methods are only examples and respective values may be acquired by methods other than those of the above-described measurement examples. Further, representative wire harnesses may previously be measured to form a data base and the data base may pertinently be utilized.

Figure 7:
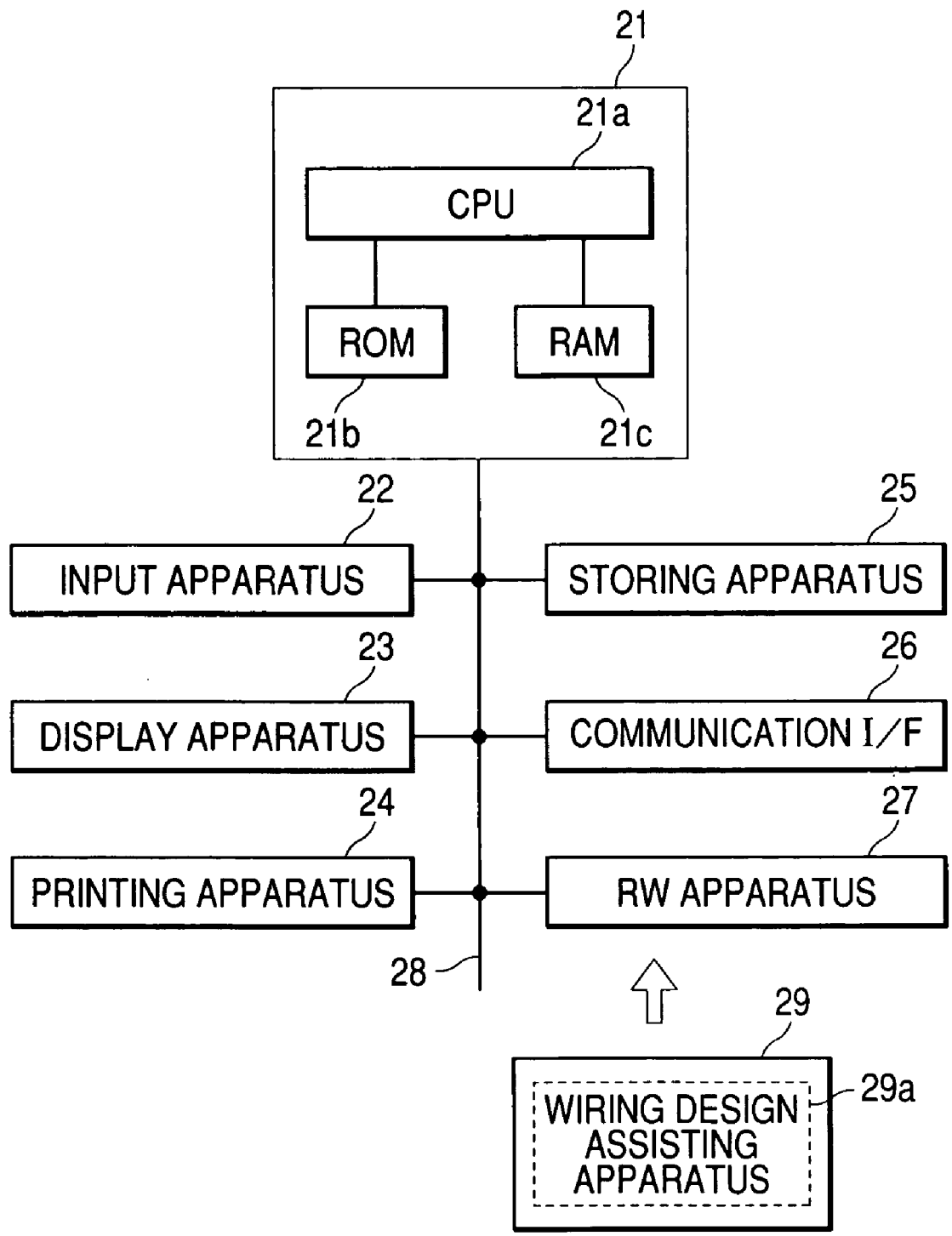
FIG. 7 is a block diagram showing an example of a hardware constitution according to the embodiment.

Next, an explanation will be given of a hardware constitution according to the embodiment for calculating and outputting the shape of the wire harness in accordance with a processing procedure, mentioned later, by utilizing the above-described theory and basic equations. FIG. 7 is a block diagram showing the hardware constitution according to the embodiment.

As shown by FIG. 7, according to the embodiment, there is used, for example, a personal computer constituted by including a microcomputer 21, an input apparatus 22, a display apparatus 23, a printing apparatus 24, a storing apparatus 25, a communication interface 26 and a read/write apparatus 27. The microcomputer 21 includes CPU 21a (central processing unit), ROM 21b for storing boot programs and the like, and RAM 21c for temporarily storing various processing results. The input apparatus 22 is a keyboard, a mouse or the like for inputting the above-described various values and the like, the display apparatus 23 is LCD, CRT or the like for displaying the processing results and the printing apparatus 24 is a printer for printing the processing results.

Further, the storing apparatus 25 is a hard disk drive for storing an installed wiring design assisting program 29a and a processing result by the program 29a, the communicating interface 26 is a modem board or the like for carrying out data communication with an external apparatus by using, for example, the internet, an LAN circuit or the like. The read/write apparatus 27 is an apparatus of reading the wiring design assisting program 29a (in correspondence with claims 8, 9) stored in a record medium 29 of CD-ROM, DVD-ROM or the like and writing a calculation result by the wiring design assisting program 29a to the record medium 29. The respective constituent elements are connected via an inner bus 28.

The microcomputer 21 installs the wiring design assisting program 29a read by the read/write apparatus 27 to the storing apparatus 25. Further, when a power source is inputted, the microcomputer 21 is started in accordance with boot programs stored to ROM 21b to start the installed wiring design assisting program 29a. Further, the microcomputer 21 carries out processings with regard to wiring design assistance according to the invention in accordance with the wiring design assisting program 29a, outputs a processing result from the display apparatus 23 or the printing apparatus 24 and holds the processing result at the storing apparatus 25 or the record medium 29. The wiring design assisting program 29a can be installed also to other personal computer or the like having the above-described basic constitution and makes the computer function as wiring design assisting apparatus (in correspondence with claims 5, 6, 7) after having been installed. Further, the wiring design assisting program 29a maybe provided not only from the record medium 29 but by way of a communication network of the internet, LAN or the like.

First Embodiment

Figure 8:
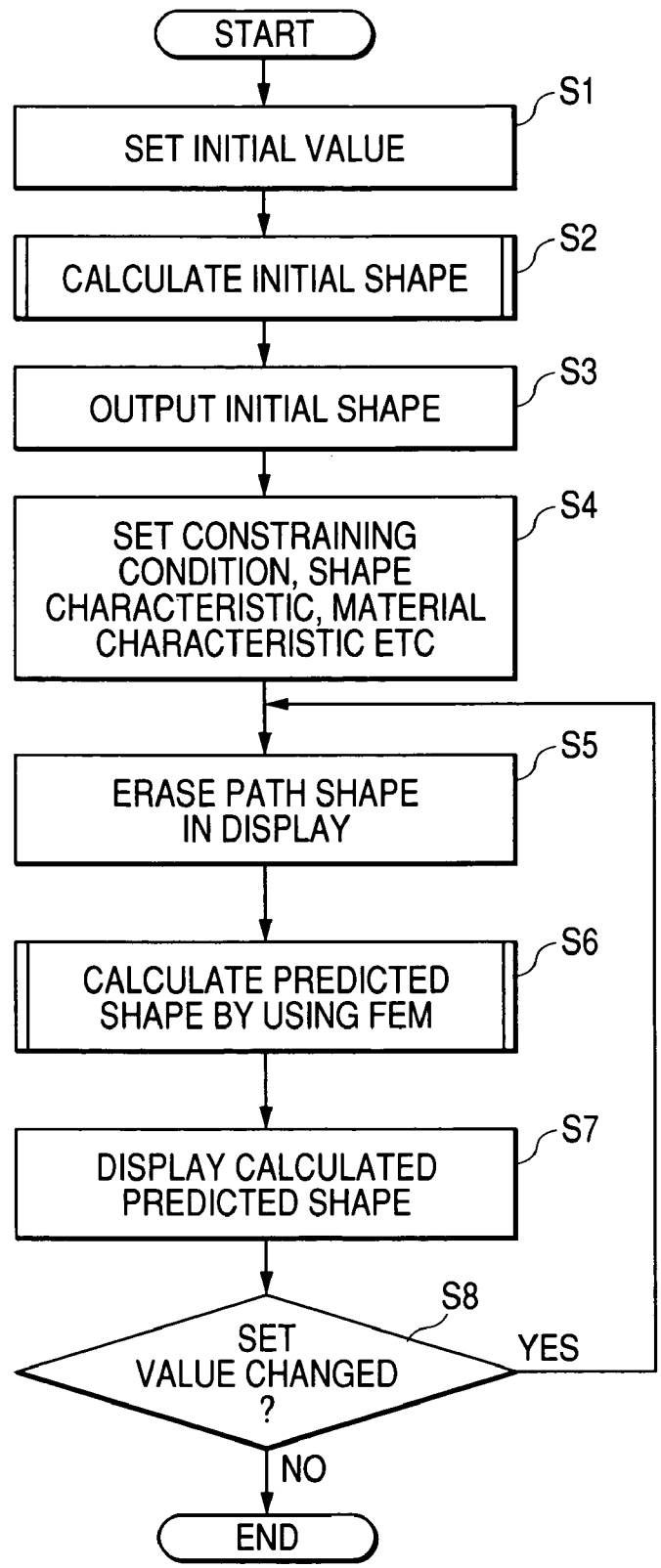
FIG. 8 is a flowchart showing a processing procedure according to a first embodiment.

Further, an explanation will be given of a processing procedure according to the first embodiment in reference to FIG. 8 and FIG. 9. FIG. 8 is a flowchart showing the processing procedure according to the embodiment which is carried out by using the hardware constitution shown in FIG. 7. FIG. 9(A) through FIG. 9(D) are views respectively exemplifying output results in a procedure of respective processings shown in FIG. 8.

Figure 9A:
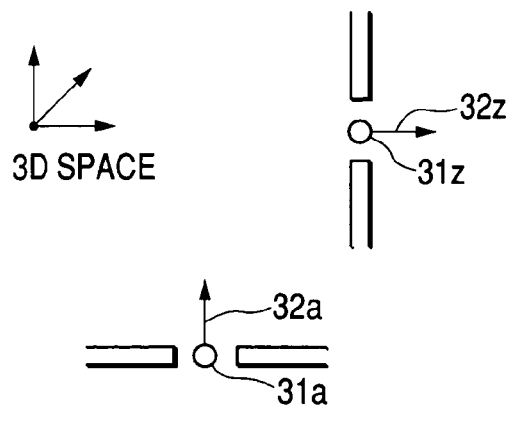
FIG. 9A through FIG. 9F are views respectively exemplifying output results in the procedure of respective processing shown in FIG. 8.
Figure 9B:
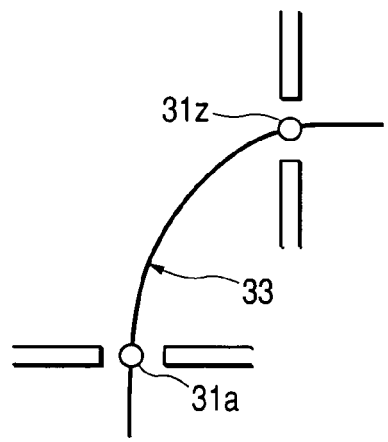

First, based on an initial value set at step S1 shown in FIG. 8, an initial shape is calculated at step S2, and at step S3, as shown by FIG. 9(B), a calculated initial shape 33 is outputted. As a initial value for acquiring the initial shape 33, for example, as shown by FIG. 9(A), there are used constrained positions 31a, 31z and constrained directions 32a, 32z attached with connectors at both ends of the wire harness constituting the object of design and a minimum bending radius of the wire harness and the like and the initial shape 33 which is a curve passing the constrained positions in the constrained directions and having a bending radius larger than the minimum bending radius or the like is provided, however, coordinates and a constrained direction or the like of a clip attached to a middle portion of the wire harness may be used. Further, the minimum bending radius is a value depending on the material characteristic of the wire harness and there is also assumed a case in which the wire harness cannot be bent to the minimum bending radius by ordinary force of an operator for operating to integrate the wire harness. Therefore, it is realistic to provide the initial shape 33 by using a bending radius capable of being bent by the ordinary force of the operator rather than the minimum bending radius. The bending radius becomes a bending radius more or less larger than the minimum bending radius depending on the material characteristic and can previously be acquired for respective typical wire harnesses by a test or the like. "Bending radius" in claims includes both of bending radii depending on the material characteristic and the force of the operator. Further, the constrained direction is a specific direction in which a direction of extending the wire harness from the constrained position is restricted or constrained by a supporting member. Further, the method of calculating the initial shape 33 is not limited to such a method but other method may be used. The above-described shape calculating processing is carried out by the microcomputer 21, the input apparatus 22 is used for setting the initial value and the display apparatus 23 is used for outputting the initial shape. Further, also in processings thereafter, the shape calculating processing is carried out by the microcomputer 21, the input apparatus 22 is used for setting various values and the display apparatus 23 is used for outputting a calculation result. Step S2 and the related hardware correspond to a first calculating unit in claims.

Figure 9C:
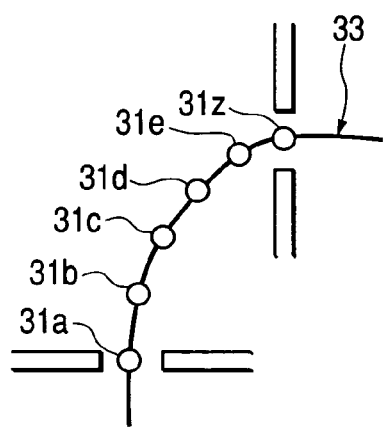

Next, at step S4, the outputted initial shape 33 is allocated with respective node points 31a through 31z shown in FIG. 9(C) and the respective node points 31a through 31z are set with constraining conditions for forcibly displacing the respective node points. As the constraining conditions, the kind of constraints (completely constrained, rotatably constrained, completely free or the like) as shown by FIG. 2 and local coordinates and the like for the respective node points 31a through 31z are set. The constraining conditions correspond to a destination of displacement. The respective node points 31a through 31z are allocated with portions attached with supporting members of connectors, clips or the like. Further, in setting the kind of constraints, as shown by FIG. 2, names of the supporting members of the connector, the clip and the like may be utilized. The various values set here relate to respective elements in the displacement vector $\{x\}$ in Equation (3), mentioned above.

Along therewith, at step S4, the shape characteristics and the material characteristics of the wire harness to be predicted are also set. As the shape characteristics, the length l and the sectional area A are set, as the material characteristics, the moment of inertia I, the polar moment of inertia J, the density $\rho$, the longitudinal modulus of elasticity E and the transverse modulus of elasticity G are set. Values previously measured or calculated as described above are utilized therefor. The value set here relates to respective elements in the rigidity matrix [K] in Equation (3), mentioned above. Step S4 and related hardware correspond to a setting unit in claims.

When the respective values have been finished to set, the operation proceeds to step 55 to erase a path shape currently in display. Next, at step S6, a new predicted shape is calculated by applying the finite element method. That is, at step S6, the respective values set at step S4 are applied to Equation (3) and respective unknowns in Equation (3) are calculated. In details, when the unknowns in the displacement vector $\{x\}$ in Equation (3) are calculated, the new predicted shape of the wire harness is provided. Step S5 and related hardware correspond to a calculating unit in claims.

Figure 9D:
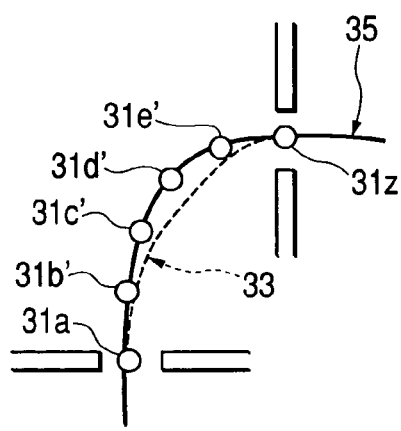
Figure 9E:
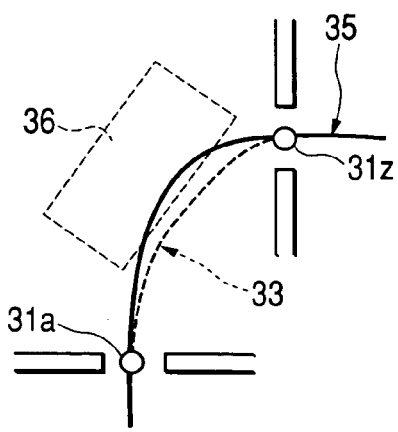

Next, at step S7, as shown by FIG. 9(D), the above-described new predicted shape 35 is displayed. Further, the respective node points 31b', 31c', 31d' and 31e' of the new predicated shape 35 shown in FIG. 9(D) respectively correspond to the respective node points 31b, 31c, 31d and 31e in the initial shape 33 shown in FIG. 9(C). Further, here, positions of the node points 31a and 31z are stationary and the other node points are forcibly displaced. Step S7 and related hardware correspond to an outputting unit in claims. Further, the output of claims is not limited to display by the display apparatus 23 but includes printing by the printing apparatus 24 or the like.

Next, at step S8, presence or absence of changing the set values is determined. For example, as shown by FIG. 6(E), as a result of forcible displacement, when it is found that the new predicted shape 35 interferes with an obstacle 36 originated from the various electric equipments, stays or the like, for example, a new bending radius, a position to be forcibly displaced newly or the like is reset by using the input apparatus 22 or the like. The factor of resetting to change is not limited thereto but may be other element in Equation (3). Further, here, when it is determined that the set value is changed, the operation returns to step S5 to calculate a successive new predicted shape (Y of step S8).

Figure 9F:
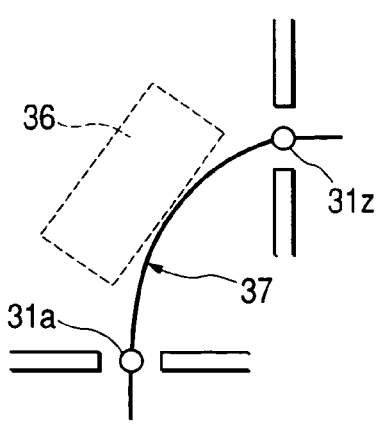

When the operation returns to step S5 through step S7, the successive new predicted shape is calculated and displayed. By repeating the verifying proceedings, a predicted shape 37 satisfying the given condition is displayed while avoiding the obstacle 36 as shown by FIG. 9(F). Further, when a predicted shape satisfying a predetermined set value is acquired, a series of the processings are finished (N of step S8). Step S8 and step S5 through step S7 correspond to a verifying unit in claims.

In this way, according to the embodiment, a predicted shape of a wiring structure of a wire harness or the like having always stable accuracy can be acquired without depending on the skill of a designer. Therefore, an optimum wiring design of the wiring structure can be carried out easily and accurately. Particularly, according to the embodiment, the embodiment is applicable to a wire harness in which the boldness and the rigidity are changed and a wire harness having the branch point which has been difficult to design accurately in the prior art. Further, the embodiment is useful also when an optimum path shape is investigated by arbitrarily changing the constrained point, the constrained direction or the like which effects significant influence on the path shape of the wire harness and which is the essential point of design.

Further, the method and the apparatus of the invention are not limited to the wire harness wired in a vehicle but similarly applicable also to a wiring structure wired indoors.

Second Embodiment

Figure 10:
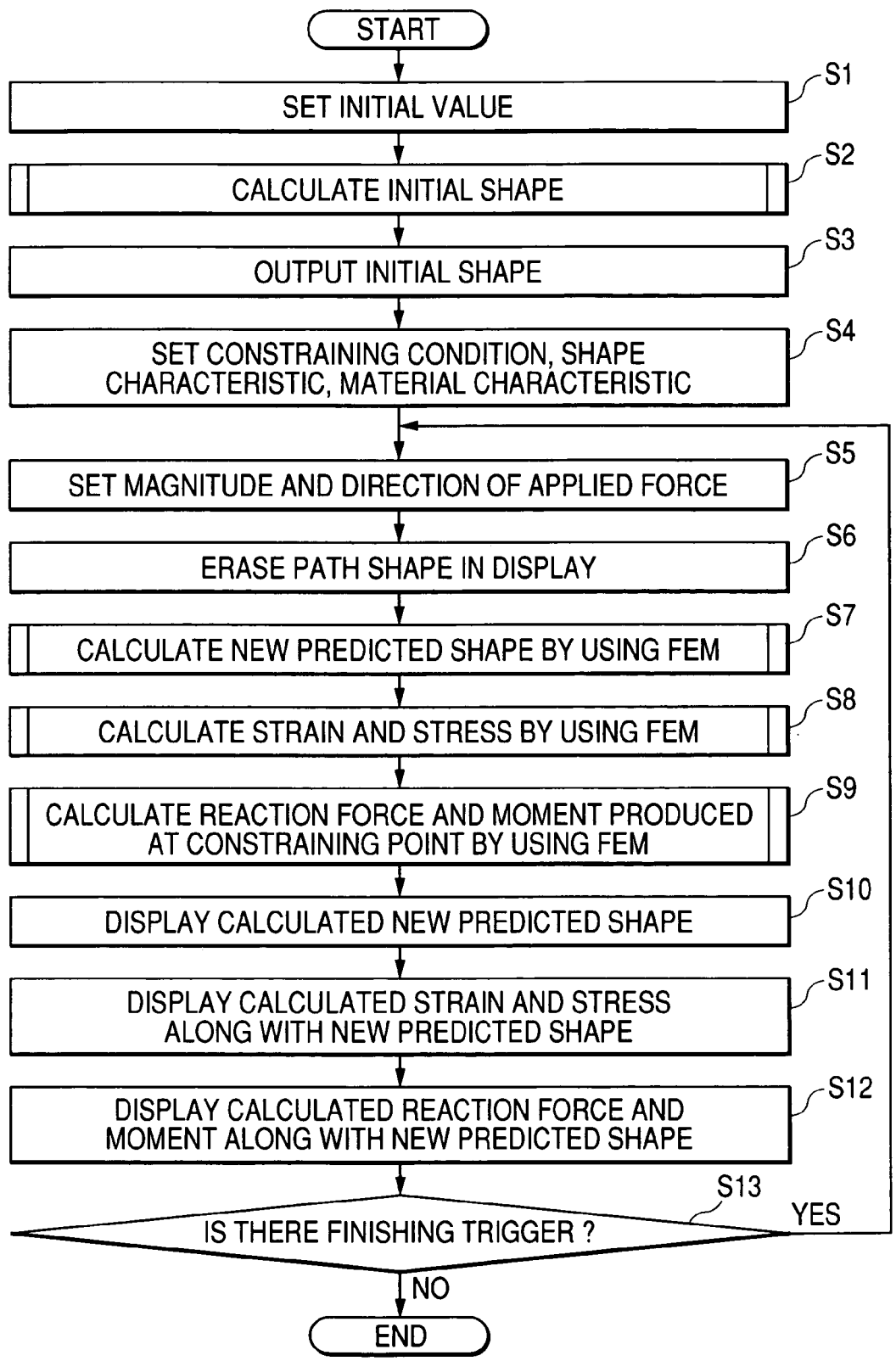
FIG. 10 is a flowchart showing a processing procedure according to a second embodiment.

An explanation will be given of a processing procedure according to the second embodiment in reference to FIG. 10 and FIG. 11D. FIG. 10 is a flowchart showing the processing procedure according to the embodiment which is carried out by using the hardware constitution shown in FIG. 7. FIG. 11A through FIG. 11D are views respectively exemplifying output results in a procedure of respective processing shown in FIG. 10.

Figure 11A:
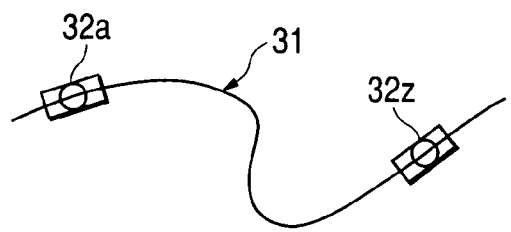
FIG. 11A through FIG. 11D are views respectively exemplifying output results in the procedure of respective processing shown in FIG. 10.
Figure 11B:
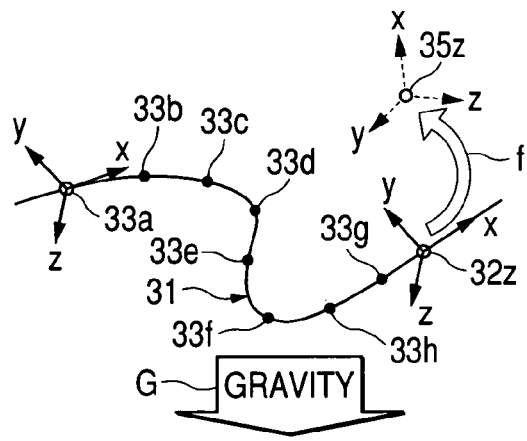

First, based on an initial value set at step S1 shown in FIG. 10, an initial shape is calculated at step S2 and at step S3, as shown by FIG. 11A, the calculated initial shape 31 is outputted. As an initial value for providing the initial shape 31, for example, positions of both ends of the wire harness constituting the object attached with the connector are used, however, a constrained direction of the connector, coordinates and a constrained direction of the clip attached to a middle portion of the wire harness, or a minimum bending radius depending on the material characteristic of the wire harness or a bending radius which can be bent by ordinary force of the operator or the like maybe used. At any rate, it is preferable to output an initial shape reflecting a shape of the wire harness constituting the object before integration. The above-described shape calculating processing is carried out by the microcomputer 21, the input apparatus 22 is used for setting the initial value and the display apparatus 23 is used for outputting the initial shape. Further, also in processings thereafter, the shape calculating processing is carried out by the microcomputer 21, the input apparatus 22 is used for setting various values and the display apparatus 23 is used for outputting a result of calculation.

Figure 11C:
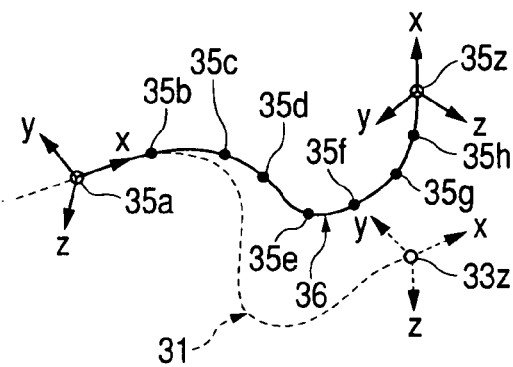
Figure 11D:
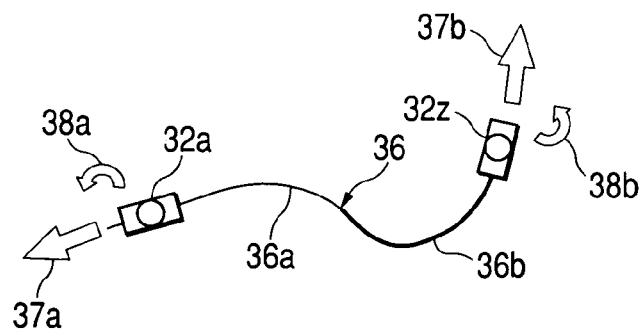

Next, at step S4, the outputted initial shape 33 is allocated with respective node points 33a through 33z shown in FIG. 11C and the respective node points 33a through 33z are set with constraining conditions for forcibly displacing the respective node points. As the constraining conditions, the kind of constraints (completely constrained, rotatably constrained, completely free or the like) as shown by FIG. 2 and local coordinates and the like for the respective node points 33a through 33z are set. The constraining conditions correspond to a destination of displacement. The respective node points 33a through 33z are allocated with portions attached with supporting members of connectors, clips or the like. Further, in setting the kind of constraints, as shown by FIG. 2, names of the supporting members of the connector, the clip and the like may be utilized. The various values set here relate to respective elements in the displacement vector $\{X\}$ in Equation (3), mentioned above.

Along therewith, at step S4, the shape characteristics and the material characteristics of the wire harness to be predicted are also set. As the shape characteristics, the length l and the sectional area A are set, as the material characteristics, the moment of inertia I, the polar moment of inertia J, the density ρ, the longitudinal modulus of elasticity E and the transverse modulus of elasticity G are set. Values previously measured or calculated as described above are utilized therefor. The value set here relates to respective elements in the rigidity matrix [K] in Equation (3), mentioned above. Step S4 and related hardware correspond to a setting unit in claims.

Next, at step S5, a magnitude and a direction of force f applied to a predetermined portion of the wire harness is set. The magnitude and the direction of the applied force f may be set to values for displacing the wire harness from the initial shape to a middle point until reaching a final shape, or may be values for displaying the wire harness to the final shape in one motion. As shown by FIG. 11B, the portion of applying the force f may be, for example, only a node point 33$z$, may be all of node points 33$b$ through 33$z$ other than the node point 33$a$ or may be any of these. The applied force f may be uniform for all of the portions of applying the force or may pertinently differ. Further, when the applied force f includes a gravitational force G of the wire harness per se, the force becomes realistic.

Further, the applied force f may be based on, for example, motion or the like of the operator anticipated in integration. Values set here relate to respective elements in the force vector [f] in Equation (3). By setting the force f in this way, a deformation state of the wiring structure accurately reflecting the motion or the like of the operator anticipated in integration can be investigated. Further, a deformation state of the wiring structure when a predetermined portion thereof is arbitrarily pulled or bent can also be investigated.

When setting of the respective values has been finished, the operation proceeds to step S6 to erase a path shape currently in display. Next, the finite element method is applied, at step S7, a new predicted shape is calculated, at step S8, strain and stress are calculated and at step S9, reaction force and moment produced at a constraining point are calculated.

That is, at step S7 through step S9, the respective values set at step S4 and step S5 are applied to Equation (3) and respective unknowns in Equation (3) are calculated. In details, when unknowns of the displacement vector $\{x\}$ in Equation (3) are calculated, a new predicted shape of the wire harness is provided. Further, when unknowns in the force vector $\{F\}$ in Equation (3) are calculated, strain and stress and reaction force and moment of the wire harness can be calculated. Further, as is well known, the stress is expressed by (external force/sectional area), the strain is expressed by (elongation/length) and therefore, in calculating the stress and strain, these relationships are also utilized.

Next, at step S10, as shown by FIG. 11C, a new predicted shape calculated as described above is displayed. Further, respective node points 35$a$, 35$b$, 35$c$, 35$d$, 35$e$, 35$f$, 35$g$ and 35$z$ of a new predicted shape 36 shown in FIG. 11C correspond to respective node points 33$a$, 33$b$, 33$c$, 33$d$, 33$e$, 33$f$, 33$g$ and 33$z$ in the initial shape 31 shown in FIG. 11B. The position of the node point 33$a$ coincides with the position of the node point 35$a$ and other node points are displaced by the applied force f and the gravitational force G.

Next, at step S11, the calculated strain and stress are displayed in the display apparatus 23 along with the new predicted shape 36. Although a mode of display may be carried out by numerical values, preferably, the strain and stress are displayed in multicolors in accordance with values thereof. For example, as shown by FIG. 11D, a portion 36$b$ of the wire harness having large values of strain and stress is displayed in red color and a portion 36$a$ thereof having the small values is displayed in green color. By displaying the portion in multicolor in this way, the strain and the stress on the wiring structure can be recognized easily and intuitively.

Further, at step S12, the calculated reaction force and moment are displayed on the display apparatus 23 along with the new predicted shape 36. Although the mode of display may be by numerical values, preferably, the reaction force and the moment are respectively displayed by arrow marks 37$a$, 37$b$ and 38$a$, 38$b$. By displaying by the arrow marks in this way, investigation of arrangement and durability of a constraining member of a connector, a clip or the like is facilitated.

Next, at step S13, presence or absence of a finishing trigger by predetermined operation or the like of the input apparatus 22 is determined and when there is the finishing trigger, the above-described series of processings are finished (Y of step S13), however, so far as there is not the finishing trigger, the operation returns to step S5 (N of step S13). When the operation returns to step S5, a value for displacing the wiring structure to a successive middle point until reaching the final shape, or a value for displacing the wire harness to the final shape in one motion is set and by a processing procedure similar to the above-described, along with a successive new predicted shape, strain and stress and reaction force and moment in correspondence therewith are displayed again. Such processings can arbitrarily be repeated. Thereby, from the initial shape to the final shape, the wire harness can be displaced by applying a predetermined force and based on the force applied at that occasion, whether operation can actually be carried out can be investigated.

In this way, according to the embodiment, the finite element method can be used in the path design of the wire harness and strain and stress produced in displaying the wiring structure while applying the force and reaction force and moment produced at the constraining point can accurately be predicted. Therefore, according to the embodiment, planning of the path design and the operational procedure which is not applied with unreasonable load as well as investigation of optimum arrangement and durability of the constraining member can be carried out easily and accurately without depending on the skill of the designer.

Further, the method and the apparatus of the invention are not limited to the wire harness wired at inside of the vehicle but applicable similarly to a wiring structure wired indoors. Further, although according to the embodiment, the wire harness which is not provided with a branch point is exemplified, the method and the apparatus of the invention is applicable similarly to a wire harness which is provided with a branch point.

Third Embodiment

Figure 12:
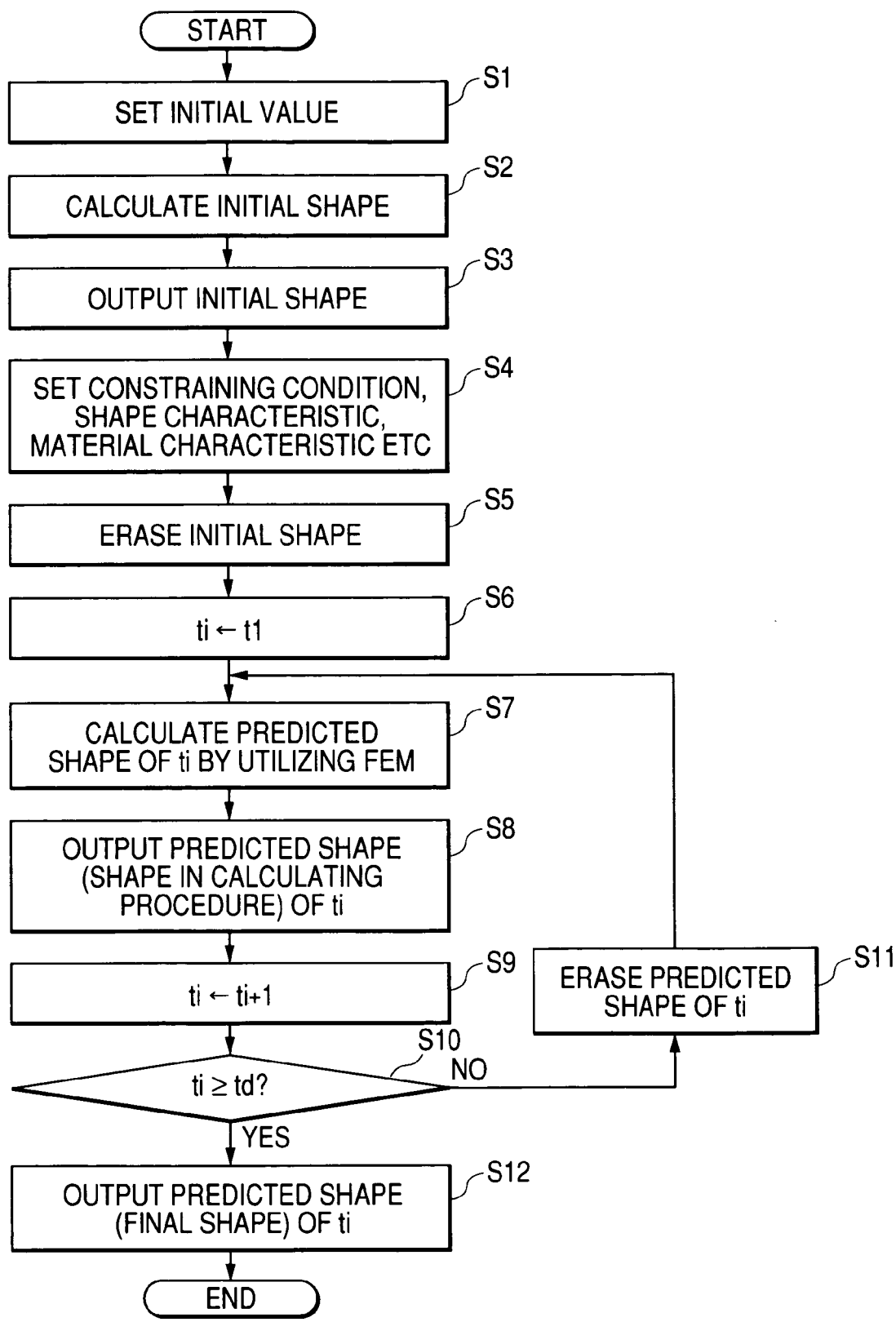
FIG. 12 is a flowchart showing a processing procedure according to a third embodiment.

An explanation will be given of a processing procedure according to the third embodiment in reference to FIG. 12 and FIG. 13D. FIG. 12 is a flowchart showing the processing procedure according to the embodiment which is carried out by using the hardware constitution shown in FIG. 7. FIG. 13A through FIG. 13D are views respectively exemplifying output results in a procedure of respective processing shown in FIG. 10.

Figure 13A:
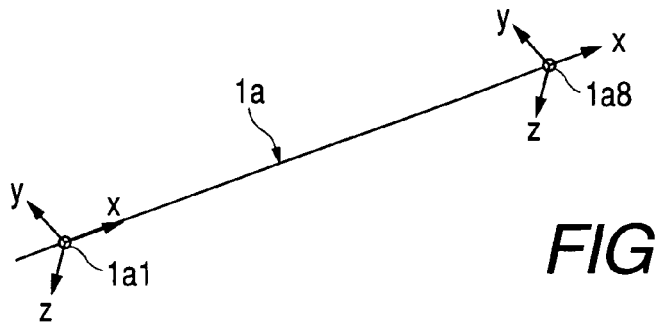
FIG. 13A through FIG. 13D are views respectively exemplifying output results in the procedure of respective processing shown in FIG. 12.
Figure 13B:
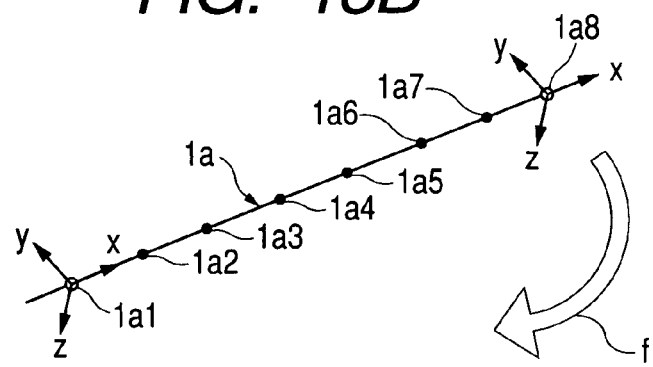

First, based on an initial value set at step S1 shown in FIG. 12, an initial shape is calculated at step S2 and at step S3, as shown by FIG. 13A, the calculated initial shape 31 is outputted. As an initial value for providing the initial shape 31, for example, positions of both ends of the wire harness constituting the object attached with the connector are used, however, a constrained direction of the connector, coordinates and a constrained direction of the clip attached to a middle portion of the wire harness, or a minimum bending radius depending on the material characteristic of the wire harness or a bending radius which can be bent by ordinary force of the operator or the like maybe used. At any rate, it is preferable to output an initial shape reflecting a shape of the wire harness constituting the object before integration. The above-described shape calculating processing is carried out by the microcomputer 21, the input apparatus 22 is used for setting the initial value and the display apparatus 23 is used for outputting the initial shape. Further, also in processing thereafter, the shape calculating processing is carried out by the microcomputer 21, the input apparatus 22 is used for setting various values and the display apparatus 23 is used for outputting a result of calculation.

Figure 13C:
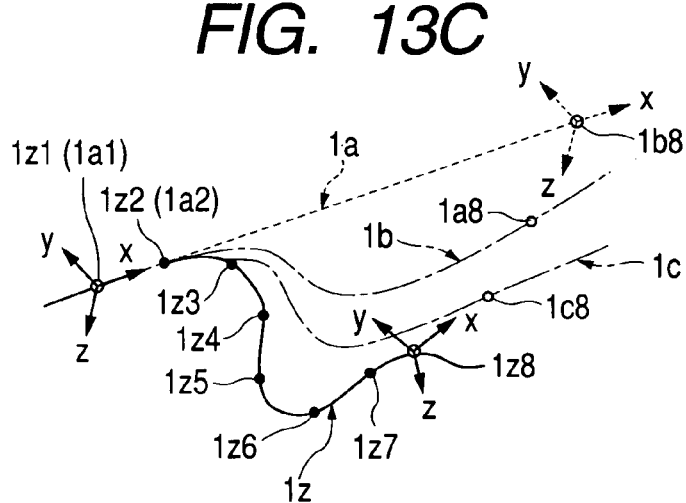
Figure 13D:
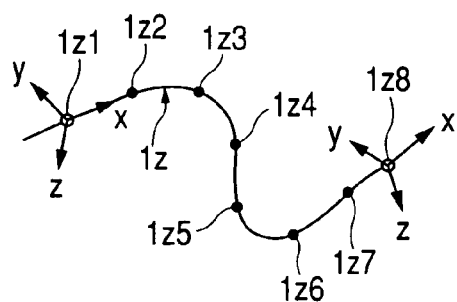

Next, at step S4, the outputted initial shape 33 is allocated with respective node points 33a through 33z shown in FIG. 13C and the respective node points 33a through 33z are set with constraining conditions for forcibly displacing the respective node points. As the constraining conditions, the kind of constraints (completely constrained, rotatably constrained, completely free or the like) as shown by FIG. 2 and local coordinates and the like for the respective node points 33a through 33z are set. The constraining conditions correspond to a destination of displacement. The respective node points 33a through 33z are allocated with portions attached with supporting members of connectors, clips or the like. Further, in setting the kind of constraints, as shown by FIG. 2, names of the supporting members of the connector, the clip and the like may be utilized. The various values set here relate to respective elements in the displacement vector $\{x\}$ in Equation (3), mentioned above.

Along therewith, at step S4, the shape characteristics and the material characteristics of the wire harness to be predicted are also set. As the shape characteristics, the length l and the sectional area A are set, as the material characteristics, the moment of inertia I, the polar moment of inertia J, the density $\rho$, the longitudinal modulus of elasticity E and the transverse modulus of elasticity G are set. Values previously measured or calculated as described above are utilized therefor. The value set here relates to respective elements in the rigidity matrix [K] in Equation (3), mentioned above.

Further, at step S4, as shown by FIG. 13B, a force f applied to a predetermined portion of the wire harness, for example, a node point 1a8 in correspondence with a position of attaching a connector may be set. The force f is based on motion or the like of an operator anticipated in integration. Values set here relate to respective elements of the force vector [f] in Equation (3). By setting the force f in this way, a deformation state of the wiring structure accurately reflecting the motion or the like of the operator anticipated in integration can be investigated. Further, a deformation state of the wiring structure when a predetermined portion is arbitrarily pulled or bent can also be investigated. Further, at step S4, various control values related to a calculating processing and the like are also set.

After finishing to set respective values necessary for calculating the shape in this way, when there is a predetermined trigger for starting to calculate, at step S5, the initial shape 1a is erased from the display apparatus 23 and thereafter, the operation proceeds to step S7 and thereafter. At step S7 and thereafter, a deformation state until the initial shape of the wire harness is displaced to a final shape in which an equilibrium is established to satisfy the constraining condition and the like set as described above is successively updated to output on the display apparatus 23. The state corresponds respectively to a plurality of time points $t_1$, $t_2$, ..., $t_i$ allocated during a time interval from the initial shape to the final shape. When an explanation is given thereto, the time interval from the initial shape to the final shape is set to 10 seconds and a deformation state at each second is outputted. The processings are explained as follows.

First, at step S6 the time point $t_i$ is set to time point $t_1$ and thereafter, the operation proceeds to step S7 and thereafter. Further, in a processing loop of step S7 through step S11, the shape of the wire harness at time points $t_1$, $t_2$, ..., $t_i$ is successively calculated by utilizing the finite element method and a deformation state of the wire harness until time point $t_d$ is updated to output.

That is, at step S7, various values set at step S4 and necessary for calculating the shape are applied to the finite element method, particularly, Equation (3) to thereby calculate a predicted shape at the time point $t_i$. Next, at step S8, a predicted shape (shape in calculating procedure) at time point $t_i$ calculated at step S7 is outputted on the display apparatus 23. Further, at step S9, time point $t_i$ is counted up and thereafter, it is determined whether the time point $t_i$ reaches final time point $t_d$ at step S10.

Further, at step S10, when it is determined that the time point $t_i$ does not reach the final time point $t_d$ yet (N of step S10), after erasing the predicted shape of the time point $t_i$ at step S11, the operation returns to step S7 and calculates a predicted shape at successive time point $t_i$ similar to the above-described. That is, until the time point $t_i$ reaches the final time point $t_d$, at step S7 and step S8, processings of calculating and outputting the shape in calculating procedure are repeatedly carried out. By the processing, a deformation state of the wire harness as shown by FIG. 13C is successively outputted. That is, a deformation state until reaching the final shape 1d, mentioned later, from the initial shape 1a via shapes in calculating procedure 1b and 1c is outputted. Further, in the drawing, positions of nodes points 1z1, 1z2, 1z3, 1z4, 1z5, 1z6, 1z7 and 1z8 of the final shape 1d respectively correspond to positions of node points 1a1, 1a2, 1a3, 1a4, 1a5, 1a6, 1a7, and 1a8 in the initial shape. Further, node points 1b8 and 1c8 of the shapes in the calculating procedure 1b and 1c correspond to the node point 1a8 in the initial shape 1a.

Further, although according to the above-described processings, the shape in the calculating procedure at respective time points are automatically successively updated to output, a processing of temporarily stopping to update to output at step S11 may be inserted between step S10 and step S11 (in correspondence with a temporarily stopping unit in claims). That is, until there is a predetermined trigger by the input apparatus 22, the current shape may be made to be stationary to output on the display apparatus 23. Thereby, a user of the apparatus can investigate a positional relationship between the wire harness and the interfering object, a degree of strain or the like by making a state of the wire harness in the midst of deformation stationary at an arbitrary time point.

Meanwhile, at step S10, when it is determined that the time point $t_i$ reaches the final time point $t_d$ (Y of step S10), the operation proceeds to step S12, outputs a predicted shape at the final time point $t_d$, that is, the final shape 1z as shown by FIG. 13D and thereafter finishes the series of processings. The final shape 1z is brought into a stable state in which a dynamic equilibrium is established to satisfy the constraining condition or the like set as described above. The final shape 1z maybe outputted also to the printing apparatus 24. Further, step S8 and step S12 correspond to a outputting unit in claims.

In this way, according to the embodiment, the deformation state of displacing the wire harness to the final shape can previously be known before carrying out integrating operation. As a result, an optimum wiring design of the wire harness can be carried out easily and accurately in a short period of time without depending on the skill of the designer. Particularly, by regarding the wire harness as the elastic body having the circular shape and coupled with the plurality of beam elements maintaining the linearity, the finite element method can be applied and prediction of the shape with higher accuracy is realized.

Further, the method and the apparatus of the invention are not limited to the wire harness wired at inside of the vehicle but applicable similarly to a wiring structure wired indoors.

According to the invention, the information with regard to the shape characteristic, the material characteristic and the constraining condition of the wiring structure is provided to the finite element method and the shape of the wiring structure predicted when the wiring structure is forcibly displaced is outputted such that the wiring structure satisfies the shape characteristic, the material characteristic and the constraining condition. By using the finite element method in this way, the predicted shape of the wiring structure having always stable accuracy can be provided without depending on the skill of a designer. Therefore, the optimum wiring design of the wiring structure can easily and accurately be carried out.

Further, according to the invention, first, the initial shape is calculated based on the constrained position, the constrained direction and the predetermined bending radius of the wiring structure set as the initial value and therefore, the wiring structure having an approximate shape can be provided at once. Further, the shape of the wiring structure predicted when the wiring structure is forcibly displaced is outputted such that the wiring structure satisfies the shape characteristic, the material characteristic and the constraining condition by providing the information with regard to the shape characteristic, the material characteristic and the constraining condition of the wiring structure to the initial shape and therefore, the predicted shape of the wiring structure having always stable accuracy can be provided without depending on the skill of a designer. Therefore, the optimum wiring design of the wiring structure can further easily and accurately be carried out.

Further, according to the invention, the information with regard to the change in the shape characteristic, the material characteristic and the constraining condition is provided to the outputted predicted shape, the predicted shape when the wiring structure is forcibly displaced is calculated again by utilizing the finite element method, the result of the calculation is outputted again to enable to verify the optimum shape of the wiring structure and therefore, the optimum wiring design of the wiring structure can further accurately be carried out.

Further, according to the invention, the constraining condition is constituted by the coordinates of the plurality of node points and the constrained degrees of freedom at the respective node points, the shape characteristic is constituted by the sectional areas and the lengths of respectives of the plurality of beam elements, further, the material characteristic is constituted by the moments of inertia, the polar moments of inertia, the densities, the longitudinal moduli of elasticity and the transverse moduli of elasticity of respectives of the plurality of beam elements, all of the values can previously be acquired from the wire harness wired to the vehicle and therefore, a realistic precise path assuming actual integrating operation can be investigated.

According to the invention, information with regard to the shape characteristic, the material characteristic and the constraining condition of the wiring structure as well as the magnitude and the direction of the applied force is provided to the finite element method, the predicted shape of the wiring structure and the strain and stress produced at the wiring structure are calculated and results of the calculation are outputted. By using the finite element method in this way, the strain and the stress produced when the wiring structure is displaced while applying the force can accurately be predicted.

Further, according to the invention, the strain and the stress are displayed in multicolor in accordance with values of these and therefore, the strain and stress on the wiring structure can be recognized easily and intuitively.

Further, according to the invention, information with regard to the shape characteristic, the material characteristic and the constraining condition of the wiring structure as well as the magnitude and the direction of the force is provided to the finite element method, the predicted shape of the wiring structure and the reaction force and the moment produced at the wiring structure are calculated and results of the calculation are outputted. In this way, by using the finite element method, the reaction force and the moment produced at the constraining point of the wiring structure produced when the wiring structure is displaced while applying the force can accurately be predicted.

Further, according to the invention, the reaction force and the moment are displayed by arrow marks and therefore, the reaction force and the moment produced at the constraining point of the wiring structure can be recognized easily and intuitively.

Further, according to the invention, the reaction force and the movement produced at the constraining point of the wiring structure are also calculated along with the strain and stress by using the finite element method and results of the calculation are outputted along with the predicted shape and therefore, influence on the wiring structure when the wiring structure is displaced while applying the force can accurately be grasped.

Further, according to the invention, the constraining condition is constituted by the coordinates of the plurality of node points and the constrained degrees of freedom at the respective node points, the shape characteristic is constituted by sectional areas and lengths of respectives of the plurality of beam elements, further, the material characteristic is constituted by the moments of inertia, the polar moments of inertia, the densities, the longitudinal moduli of elasticity and the transverse moduli of elasticity of respectives of the plurality of beam elements, all of the values can previously be acquired from the wire harness wired to the vehicle and therefore, a realistic precise path assuming actual integrating operation can be investigated.

According to the invention, the predicted shape of the wiring structure satisfying the predetermined condition is outputted by regarding the wiring structure constituted by the plurality of pieces of line streak members as the elastic body having the circular shape and coupled with the plurality of beam elements maintaining the linearity and utilizing the finite element method. Particularly, the behavior of deforming the wiring structure from the initial shape to the final shape in which the equilibrium is established while satisfying the shape characteristic, the material characteristic and the constraining condition of the wiring structure is successively calculated by utilizing the finite element method and successively outputted. Therefore, the deformation state of the wiring structure until the wiring structure is displaced to the final shape can previously be known before carrying out the integrating operation. As a result, the optimum wiring design of the wiring structure can easily and accurately be carried out in a short period of time without depending on the skill of the designer.

According to the invention, the deformation state of the wiring structure when force is applied to a predetermined portion of the wiring structure is successively calculated and a result thereof is successively outputted and therefore, the deformation state of the wiring structure accurately reflecting motion or the like of the operator anticipated in integration can be investigated. Further, also the state deformation state of the wiring structure when the predetermined portion is arbitrarily pulled or bent can be investigated.

According to the invention, the constraining condition is constituted by the coordinates of the respective apexes of the plurality of beam elements constituting the wiring structure and the degrees of freedom at the respective apexes, the shape characteristic is constituted by sectional areas and lengths of the beam elements of the wiring structure, the material characteristic is constituted by the moments of inertia, the polar moments of inertia, the densities, the longitudinal module of elasticity and the transverse module of elasticity of the beam elements and all the values can previously be acquired from the wire harness wired to the vehicle. Therefore, a wiring simulation of the wire harness assuming the actual integrating operation can be carried out.

According to the invention, the state of deforming the wiring structure constituting the object from the initial shape to the final shape in which the equilibrium is established is successively calculated and the result is successively outputted. Therefore, the deformation state of the wiring structure until the wiring structure is displaced to the final shape can previously be known before carrying out the integrating operation. As a result, further optimum wiring design of the wiring structure can be carried out easily and accurately.

According to the invention, output by an outputting unit is temporarily made stationary by a trigger based on manual operation. Therefore, a user of the apparatus can make the output of the wiring structure in the midst of deformation stationary at an arbitrary time point and the positional relationship between the wiring structure and an interfering object, the degree of strain or the like can be investigated.

What is claimed is:

1. A method of assisting with a wiring design of a wiring structure comprising the steps of:
    representing the wiring structure as an elastic body which has a circular section and in which a plurality of linear beam elements are coupled with each other;
    applying information concerning a shape characteristic, a material characteristic and a constraining condition of the wiring structure as a predetermined condition to a finite element method;
    calculating a predicted shape of the wiring structure such that the predetermined condition is satisfied and the wiring structure is displaced;
    outputting the calculated predicted shape of the displaced wiring structure;
    determining if the displaced wiring structure is located in a suitable position for the wiring design.

2. The method according to claim 1, wherein the calculating step calculates the predicted shape such that the wiring structure is forcibly displaced so as to satisfy the predetermined condition.

3. The method according to claim 1, wherein
    information concerning a change in the shape characteristic, the material characteristic and the constraining condition is provided to the output predicted shape,
    a new predicted shape of the forcibly displaced wiring structure is calculated again by utilizing the finite element method, and
    the new predicted shape is output again to enable verification of an optimum shape of the wiring structure.

4. The method according to claim 1, wherein
    the wiring structure is a wire harness wired to a vehicle,
    the constraining condition is defined by coordinates of respective apexes of the plurality of beam elements and degrees of freedom at the respective apexes,
    the shape characteristic is defined by a sectional area and a length of the beam element of the wiring structure, and
    the material characteristic is defined by a moment of inertia, a polar moment of inertia, a density and a longitudinal modulus of elasticity and a transverse modulus of elasticity of the beam element.

5. The method according to claim 1, wherein
    in the calculating step, strain and stress of the wiring structure are calculated and
    in the outputting step, the calculated strain and stress are output together with the calculated predicted shape.

6. The method according to claim 5, wherein the calculated strain and stress are displayed in multicolor in accordance with values of the strain and stress.

7. The method according to claim 5, wherein
    in the calculating step, reaction force and moment produced at a constraining point of the wiring structure are calculated, and
    in the outputting step, the calculated reaction force and moment are output together with the calculated strain, stress and predicted shape.

8. The method according to claim 1, wherein
    in the calculating step, reaction force and moment produced at a constraining point of the wiring structure are calculated, and
    in the outputting step, the calculated reaction force and moment are output together with the calculated predicted shape.

9. The method according to claim 8, wherein the calculated reaction force and moment are displayed by arrow marks.

10. The method according to claim 1, wherein
    in the calculating step, deformation states of the wiring structure deformed from an arbitrary initial shape to a final shape which satisfies the predetermined condition are successively calculated, and
    in the outputting step, the calculated deformation states of the wiring structure are successively output.

11. The method according to claim 10, wherein the deformation states of the wiring structure when a predetermined force is applied to a predetermined portion of the wiring structure are successively calculated and output.

12. A method of assisting with a wiring design of a wiring structure comprising the steps of:
    representing the wiring structure as an elastic body which has a circular section and in which a plurality of linear beam elements are coupled each other,
    calculating an initial shape of the wiring structure based on a predetermined bending radius, a constrained position of the wiring structure, and a constrained direction with respect to the wiring structure at the constrained position as initial value;

providing, for the initial shape, a condition concerning a shape characteristic, a material characteristic and a constraining condition of the wiring structure;

calculating a predicted shape of the wiring structure such that the provided condition is satisfied by utilizing a finite element method and the wiring structure is forcibly displaced with respect to the initial shape;

outputting the calculated predicted shape; and determining if the displaced wiring structure is located in a suitable position for the wiring design.

13. The method according to claim 12, wherein information concerning a change in the shape characteristic, the material characteristic and the constraining condition is provided to the output predicted shape, a new predicted shape of the forcibly displaced wiring structure is calculated again by utilizing the finite element method, and the new predicted shape is output again to enable verification of an optimum shape of the wiring structure.

14. The method according to claim 12, wherein the wiring structure is a wire harness wired to a vehicle, the constraining condition is defined by coordinates of respective apexes of the plurality of beam elements and degrees of freedom at the respective apexes, the shape characteristic is defined by a sectional area and a length of the beam element of the wiring structure, and the material characteristic is defined by a moment of inertia, a polar moment of inertia, a density and a longitudinal modulus of elasticity and a transverse modulus of elasticity of the beam element.

15. An apparatus of assisting with a wiring design of a wiring structure in which the wiring structure is represented as an elastic body which has a circular section and in which a plurality of linear beam elements are coupled with each other, and a shape of the wiring structure which satisfies a predetermined condition is predicted by utilizing a finite element method, the apparatus comprising:

a setting unit for setting information concerning a shape characteristic, a material characteristic and a constraining condition of the wiring structure as the predetermined condition;

a calculating unit for calculating a predicted shape of the wiring structure such that the predetermined condition is satisfied by applying the predetermined condition to the finite element method and the wiring structure is displaced; and an outputting unit for outputting the predicted shape calculated by the calculating unit for determining if the displaced wiring structure is located in a suitable position for the wiring design.

16. The apparatus according to claim 15, wherein the calculating unit calculates the predicted shape such that the wiring structure is forcibly displaced so as to satisfy the condition.

17. The apparatus according to claim 15 further comprising a verifying unit which provides information concerning a change in the shape characteristic, the material characteristic and the constraining condition to the predicted shaped output by the outputting unit, calculates again a new predicated shape of the forcibly displaced wiring structure by utilizing the finite element method and makes the outputting unit output the new calculated predicted shape to enable verification of an optimum shape of the wiring structure.

18. The apparatus according to claim 15, wherein the calculating unit calculates strain and stress of the wiring structure, and the outputting unit outputs the calculated strain and stress together with the calculated predicted shape.

19. The apparatus according to claim 15, wherein the calculating unit calculates reaction force and moment produced at a constraining point of the wiring structure, and the outputting unit outputs the calculated reaction force and moment together with the calculated predicted shape.

20. The apparatus according to claim 15, wherein the calculating unit successively calculates states of the wiring structure deformed from an arbitrary initial shape to a final shape which satisfies the predetermined condition, and the outputting unit successively outputs the calculated states of the wiring structure.

21. The apparatus according to claim 20 further comprising a second setting unit for setting a predetermined force applies to a predetermined portion of the wiring structure as the predetermined condition, wherein the calculating unit successively calculates the deformation states of the wiring structure to which the force is applied, and the outputting unit successively updates and outputs the deformation state of the wiring structure based on the calculated deformation states of the wiring structure.

22. The apparatus according to claim 20 further comprising a temporary stopping unit for temporarily stopping an output by the outputting unit by a trigger based on manual operation.

23. An apparatus for assisting with a wiring design of a wiring structure in which the wiring structure is represented as an elastic body which has a circular section and in which a plurality of linear beam elements are coupled with each other, and a shape of the wiring structure which satisfies a predetermined condition is predicted by utilizing a finite element method, the apparatus comprising:

a first calculating unit for calculating an initial shape of the wiring structure based on a predetermined bending radius, a constrained position of the wiring structure and a constrained direction with respect to the wiring structure at the constrained position set as an initial value;

a setting unit for setting a condition concerning a shape characteristic, a material characteristic and a constraining condition of the wiring structure to the initial shape;

a second calculating unit for calculating a predicated shape of the wiring structure such that the set condition is satisfied by utilizing the finite element method and the wiring structure is displaced; and an outputting unit for outputting the predicted shape calculated by the second calculating unit for determining if the displaced wiring structure is located in a suitable position for the wiring design.

24. The apparatus according to claim 23 further comprising a verifying unit which provides information concerning a change in the shape characteristic, the material characteristic and the constraining condition to the predicted shaped output by the outputting unit, calculates again a new predicated shape of the forcibly displaced wiring structure by utilizing the finite element method and makes the outputting unit output the new calculated predicted shape to enable verification of an optimum shape of the wiring structure.

25. A recording medium storing a program which causes a computer to function as an apparatus for assisting with a wiring design of a wiring structure in which the wiring structure is represented as an elastic body which has a circular section and in which a plurality of linear beam elements are coupled with each other, and a shape of the wiring structure which satisfies a predetermined condition is predicted by utilizing a finite element method, the program causing the computer to functions as:

a setting unit for setting information concerning a shape characteristic, a material characteristic and a constraining condition of the wiring structure as the predetermined condition;

a calculating unit for calculating a predicted shape of the wiring structure by applying the predetermined condition to the finite element method such that the condition is satisfied and the wiring structure is displaced; and an outputting unit for outputting the predicted shape calculated by the calculating unit for determining if the displaced wiring structure is located in a suitable position for the wiring design.

26. The recording medium according to claim 25, wherein the calculating unit calculates the predicted shape such that the wiring structure is forcibly displaced so as to satisfy the condition.

27. The recording medium according to claim 25, wherein the program causes the computer to calculate strain and stress of the wiring structure, and output the calculated strain and stress together with the calculated predicted shape.

28. The recording medium according to claim 25, wherein the program causes the computer to calculate reaction force and moment produced at a constraining point of the wiring structure, and output the calculated reaction force and moment together with the calculated predicted shape.

29. The recording medium according to claim 25, wherein the program causes the computer to successively calculate deformation states of the wiring structure deformed from an arbitrary initial shape to a final shape which satisfies the predetermined condition, and successively update and output the deformation state of the wiring structure based on the calculated states of the wiring structure.

30. A recording medium storing a program which causes a computer to function as an apparatus for assisting with a wiring design of a wiring structure in which the wiring structure is represented as an elastic body which has a circular section and in which a plurality of linear beam elements are coupled with each other, and a shape of the wiring structure which satisfies a predetermined condition is predicted by utilizing a finite element method, the program causing the computer to function as:

a first calculating unit for calculating an initial shape of the wiring structure based on a predetermined bending radius, a constrained position of the wiring structure and a constrained direction with respect to the wiring structure at the constrained position set as an initial value;

a setting unit for setting a condition concerning a shape characteristic, a material characteristic and a constraining condition of the wiring structure to the initial shape;

a second calculating unit for calculating a predicated shape of the wiring structure by utilizing the finite element method such that the set condition is satisfied and the wiring structure is forcibly displaced; and an outputting unit for outputting the predicted shape calculated by the second calculating unit for determining if the displaced wiring structure is located in a suitable position for the wiring design.

31. A method of assisting with a wiring design of a wiring structure by calculating a predicted shape concerning the wiring structure, the method comprising the steps of:

successively calculating deformation states of the wiring structure deformed from an arbitrary initial shape to a final shape; and successively outputting the calculated states for determining if the final shape represents the wiring structure located in a suitable position for the wiring design.

* * * * *